US012801762B2

(12) United States Patent
Sipolins et al.

(10) Patent No.: US 12,801,762 B2
(45) Date of Patent: Nov. 17, 2026

(54) SYSTEMS AND METHODS FOR PROVIDING A GUARDED MODE FOR AN OPERATING SYSTEM OF A COMPUTING DEVICE

(71) Applicant: Adeia Guides Inc., San Jose, CA (US)

(72) Inventors: Aldis Sipolins, Somerville, MA (US); Charles Dasher, Lawrenceville, GA (US)

(73) Assignee: Adeia Guides Inc., San Jose, CA (US)

( * ) Notice: Subject to any disclaimer, the term of this patent is extended or adjusted under 35 U.S.C. 154(b) by 80 days.

(21) Appl. No.: 18/415,818

(22) Filed: Jan. 18, 2024

(65) Prior Publication Data

US 2025/0238530 A1 Jul. 24, 2025

(51) Int. Cl.
*G06F 21/64* (2013.01)
*G06F 21/60* (2013.01)
*G06F 21/74* (2013.01)

(52) U.S. Cl.
CPC ............ *G06F 21/604* (2013.01); *G06F 21/74* (2013.01)

(58) Field of Classification Search
CPC ........... G06F 21/12-128; G06F 21/604; G06F 21/71; G06F 21/74; G06F 2212/1052; G06F 2221/2105; G06F 2221/2149
See application file for complete search history.

(56) References Cited

U.S. PATENT DOCUMENTS 6,167,517 A 12/2000 Gilchrist et al.
9,852,355 B2 12/2017 Couleaud et al.
10,083,304 B2 9/2018 Chhabra et al.
10,482,698 B2 11/2019 Caterino et al.
10,496,979 B2 12/2019 Taveau et al.
2007/0198850 A1 8/2007 Martin et al.
2015/0220734 A1* 8/2015 Nalluri .................... G06F 8/436 726/23
2015/0269555 A1 9/2015 Clark
2016/0381026 A1* 12/2016 Silva Pinto ........... H04W 12/08 726/4
2018/0174146 A1 6/2018 Bansal et al.
2019/0205889 A1 7/2019 Cantrell et al.

(Continued)

OTHER PUBLICATIONS

"Amazon Palm Payment, Using Palm-Vein Mapping Technology to Enable Contactless Payments" https://chargebacks911.com/amazon-palm-payment/ (2022) Retrieved from Internet Oct. 23, 2023.

(Continued)

*Primary Examiner* — Kevin Bechtel
(74) *Attorney, Agent, or Firm* — HG Law LLP

(57) ABSTRACT

Systems and methods are provided for entering a guarded mode of an operating system of a computing device. A guarding system may receive a user input at a computing device. The operating system of the computing device may be configured to operate in a guarded mode or a non-guarded mode. The guarding system may determine, while the operating system is operating in the non-guarded mode, that the received user input matches a user input configured to initiate the guarded mode. The guarding system may cause the operating system to transition from the non-guarded mode to the guarded mode. In response to the operating system transitioning to the guarded mode, the guarding system may modify at least one attribute of a third-party application installed on the computing device.

20 Claims, 9 Drawing Sheets

(56) References Cited

U.S. PATENT DOCUMENTS

| | | | | |
|---|---|---|---|---|
| 2021/0042262 | A1* | 2/2021 | Nair | G06F 16/116 |
| 2021/0334813 | A1 | 10/2021 | Clausen et al. | |
| 2021/0398131 | A1 | 12/2021 | Bermudez et al. | |
| 2023/0011633 | A1 | 1/2023 | Waldron et al. | |
| 2024/0211986 | A1 | 6/2024 | Bermudez et al. | |
| 2025/0053984 | A1 | 2/2025 | Lal et al. | |

OTHER PUBLICATIONS

"Body Temperature Measurement" https://www.te.com/usa-en/trends/connected-life-health-tech/medical-sensor-technology-and-applications/body-temperature-measurement.html Retrieved from the Internet Oct. 23, 2023.

"Edge TPU" https://cloud.google.com/edge-tpu Retrieved from the Internet Oct. 23, 2023.

Browne, "Mastercard launches tech that lets you pay with your face or hand in stores" https://www.cnbc.com/2022/05/17/mastercard-launches-tech-that-lets-you-pay-with-your-face-or-hand.html (2002) Retrieved from the Internet Oct. 23, 2023.

Drexelius et al., "A Simple Non-Contact Optical Method to Quantify In-Vivo Sweat Gland Activity and Pulsation," IEEE Trans Biomed Eng. 69(8):2638-2645 (2022).

Happy et al., "Automatic facial expression recognition using features of salient facial patches," IEEE Transactions on Affective Computing, 6(1): 1-12 (2015).

https://one.amazon.com/ Retrieved from the Internet Oct. 23, 2023.

Hui et al., "Coverage of Emotion Recognition for Common Wearable Biosensors" Biosensors, 8(30): 1-19 (2018).

Li et al., "The Fusion of Electroencephalography and Facial Expression for Continuous Emotion Recognition," IEEE Access, 7:155724-155736 (2019).

Raghavan, "Apple Pay vs. Google Wallet" https://www.investopedia.com/articles/personal-finance/010215/apple-pay-vs-google-wallet-how-they-work.asp (2023) Retrieved from the Internet Oct. 23, 2023.

Sorrel, "Amazon's Palm Payments Are Convenient, But Are They Safe?" https://www.lifewire.com/amazons-palm-payments-are-convenient-but-are-they-safe-6455339 (2022) Retrieved from the Internet Oct. 23, 2023.

Tomar, "Explained: All Kinds Of Sensors In Smartwatch, Pros and Cons," https://www.cashify.in/explained-sensors-in-smartwatch (2023) Retrieved from the Internet Oct. 23, 2023.

Vincent, "AI 'emotion recognition' can't be trusted" https://www.theverge.com/2019/7/25/8929793/emotion-recognition-analysis-ai-machine-learning-facial-expression-review (2019) Retrieved from the Internet Oct. 23, 2023.

Zamkah et al., "Identification of Suitable Biomarkers for Stress and Emotion Detection for Future Personal Affective Wearable Sensors," Biosensors, 10(4): 1-15 (2020).

Apple Inc. , "One app to find it all", Apple Inc. "One app to find it all" retrieved from https://www.apple.com/icloud/find-my/ (7 Pages).

Apple Support , "Use Emergency SOS on your iPhone", Apple Support, "Use Emergency SOS on your iPhone" retrieved from https://support.apple.com/en-us/104992 (6 Pages).

Lopes, "How is my data stored?" https://payface-support.freshdesk.com/support/solutions/articles/150000004058-como-os-meus-dados-s%C3%A30-armazenados- (2022) Retrieved from the Internet Oct. 23, 2023.

* cited by examiner

SYSTEMS AND METHODS FOR PROVIDING A GUARDED MODE FOR AN OPERATING SYSTEM OF A COMPUTING DEVICE

BACKGROUND

This disclosure is related to systems and methods for causing a computing device to operate in a guarded mode of an operating system of the computing device.

SUMMARY

Modern consumer electronics such as smartphones, tablets, and laptops often have a number of applications (or apps) installed thereon. Such applications may be native applications provided by a same entity (e.g., Apple®) that provides an operating system (e.g., iOS) for the device, or may be third-party applications (e.g., a banking app) provided by a second entity (e.g., JP Morgan Chase®) distinct from the first entity. Certain applications, whether native applications or third-party applications, contain a wide range of sensitive information, from private photographs and messages to financial and health data. Devices often display icons for applications on user interfaces to enable such applications to be easily accessible to users using the devices.

In one approach, to prevent unauthorized access to personal data, entry of a passcode or PIN is required in order to access any native or third-party applications on a user's smartphone, and a device may be locked if the wrong PIN or passcode is entered over a certain number of attempts. However, while this is generally helpful to restrict unauthorized access to the user's personal data, there are some circumstances where, even if the correct passcode is provided, it might not be desirable to provide access to all (or any) of the data or functionalities associated with applications installed on the smartphone. For example, where users let others use their device willingly (e.g., after having entered the passcode or PIN, to allow another person to view their photos from a recent trip) or under duress, coercion or pressure (e.g., if a user is being mugged, where a user is forced to provide their passcode or PIN code), users face risks such as identity theft, financial loss, and/or violation of personal privacy. For example, even if a friend of the user is permitted to use the user's device for a specific purpose (e.g., viewing photos for a brief period of time), such friend may (unbeknownst to the user) access other data (e.g., personal banking data, or a dating app profile) that the user did not expect the friend to access. In the above example of the mugger or bad actor, such bad actor may access any data or application on the user's smartphone, against the will of the user.

In another approach, a device enables a user to perform certain functions, even without providing the correct PIN code or passcode. For example, an SOS mode (or a lost smartphone mode) of a smartphone might allow a telephone call to be made, such as to alert authorities of an emergency or to call back the owner of a lost smartphone, using a phone application native to the device's operating system. While this is helpful in an emergency situation or if a smartphone is lost, such an approach lacks the flexibility to adapt to other situations, such as sharing a device with a friend or family member willingly, and lacks a mechanism to selectively enable access to certain application functionalities or certain application data at various levels of granularity. For example, in such approaches discussed above, whether certain application icons are displayed (and/or a manner of displaying such icons), which functions of an application are available, and what data is accessible remain unchanged regardless of the person who is accessing the device (as long as the correct passcode or PIN is entered), and regardless of the scope of such person's purpose for accessing the device. Accordingly, there is a need for an operating system mode and/or security mechanism that can be configured to protect confidential and sensitive information related to a user associated with a computing device (e.g., if the user is compelled to unlock their device, or if the user is allowing another user to use his or her device), while still allowing access to some functionalities, data and/or displays of the computing device, while the computing device is in an unlocked state.

To help address these problems, the systems, methods, and apparatuses disclosed herein may be configured to cause a computing device to operate in a guarded mode of an operating system of the computing device. In some embodiments, as disclosed herein, a guarded mode of an operating system of a computing device is a state entered by the operating system that provides operating system-level controls to allow access to some data (e.g., unsensitive data and/or functions) while simultaneously preventing other certain data (e.g., sensitive data and/or functions) of one or more applications or other data of the computing device from being accessed by users that are only partially authorized (e.g., authorized to access one or more installed applications, but not authorized to access other installed application(s), and/or authorized to access one or more features or portions of an installed application, but not authorized to access other feature(s) or portion(s) of the installed application). In some embodiments, the operating system may operate in the guarded mode while the computing device is in an unlocked state (e.g., at a home screen of the computing device, where other features or apps may be accessible, and where such home screen may be reached upon entry of a correct pass code or PIN) or a locked state (e.g., at a lock screen or a login screen of the computing device). Alternatively, in some embodiments, the guarded mode of the operating system of the computing device is only applicable (and/or is only implemented, and/or its modifications are only apparent) after the computing device is unlocked, a successful login is performed, or general functionality of the device is enabled. While a locked state of a computing device may disable access to all or substantially all data and functions (e.g., sometimes with the exception of emergency calls), the guarded mode of the operating system of the computing device may selectively control the functionality of, and/or access to, a subset of data and/or a subset of third-party applications. For example, the lock screen of the computing device may disable nearly all functions of the computing device, unless a user is authenticated. The disclosed techniques include receiving, at a computing device, a user input, wherein each of an operating system and a third-party application is installed on the computing device. In the disclosed techniques, the operating system is configured to operate in a guarded mode or a non-guarded mode, and the third-party application is configured to have at least one attribute while the operating system of the computing device is operating in the non-guarded mode.

The disclosed techniques include determining, while the operating system of the computing device is operating in the non-guarded mode, whether the received user input matches a user input configured to initiate the guarded mode of the operating system of the computing device. In response to determining that the received user input matches the user input configured to initiate the guarded mode, the disclosed techniques cause the operating system of the computing device to transition from the non-guarded mode to the guarded mode, and, based on the operating system transitioning to the guarded mode, to modify the at least one attribute of the third-party application. Such aspects enable transitioning to a guarded mode of an operating system of a computing device in which one or more attributes (e.g., certain personal data available via a third-party application, whether an application icon is displayed at all, whether a particular function of the third-party application is to be made available) may be modified with respect to such attribute(s) in a non-guarded mode (e.g., a normal operating mode) of the operating system. Such transition may be based on user input or may be automatic (e.g., based on detecting that a particular user is now using the computing device). Such aspects provide a flexible approach for selectively providing access to certain functionalities and/or data of a third-party application at various levels of granularity, thereby protecting against identity theft, financial loss, and/or violation of personal privacy that might occur when another person is using a user's computing device, while at the same time permitting certain functions (e.g., entry of contact information or viewing certain photos) while another user is using the user's computing device.

In some embodiments, a guarding system of a computing device receives a user input. For example, a computing device, e.g., a smartphone, receives three clicks or presses of a lock button on the side of the smartphone. An operating system and a third-party application may be installed on the computing device, in addition to the guarding system. The operating system is configured to operate in a guarded mode and a non-guarded mode. While the operating system is operating in the non-guarded mode, the third-party application has at least one attribute. The at least one attribute may correspond to providing a plurality of functions of the third-party application.

In some embodiments, while the operating system of the computing device is operating in the non-guarded mode, the guarding system determines whether the received user input matches a user input configured to initiate the guarded mode of the operating system of the computing device. Particular user inputs may indicate to the guarding system that the user of the computing device is requesting the operating system to initiate the guarded mode of the operating system. Such aspects allow for the operating system of the computing device to efficiently and discretely transition to the guarded mode, such that other people around the user of the computing device may be unaware that the operating system is transitioning to the guarded mode.

In some embodiments, in response to determining that the received user input matches the user input configured to initiate the guarded mode, the guarding system causes the operating system of the computing device to transition from the non-guarded mode to the guarded mode. Based on the operating system transitioning to the guarded mode, the guarding system modifies the at least one attribute of the third-party application. Such aspects allow for increased data security for one or more accounts associated with the third-party application and the computing device. In this way, the guarding system protects confidential data and assets associated with the computing device and with the user of the computing device.

In some embodiments, the at least one attribute of the third-party application while the operating system of the computing device is operating in the non-guarded mode comprises providing an icon for the third-party application for display at a user interface of the computing device. For example, in response to receiving a user interface selection of the icon while in the non-guarded mode, the operating system operating in the non-guarded mode launches the third-party application at the computing device. In some approaches, while the operating system of the computing device is operating in the guarded mode, the guarding system modifies the at least one attribute of the third-party application by preventing display of the icon for the third-party application. Such aspects allow for increased security of confidential data and assets while someone other than the user associated with the computing device is using the computing device. For example, if no icon for the third-party application is provided, the third-party application is less likely to be accessed by such other user.

In some embodiments, while the operating system of the computing device is operating in the non-guarded mode, a plurality of icons for third-party applications, including the icon for the third-party application, are provided for display at the user interface of the computing device. While preventing the display of the icon for the third-party application while the operating system of the computing device is operating in the guarded mode, the guarding system continues to display the other icons of the plurality of icons for the other third-party applications. The guarding system may determine which third-party application icon(s) to display (and/or prevent display of) based on prior user input selections.

In some embodiments, the at least one attribute of the third-party application corresponds to providing a plurality of functions while the operating system of the computing device is operating in the non-guarded mode. While the operating system of the computing device is operating in the guarded mode, the guarded system may modify the at least one attribute of the third-party application by modifying at least one function of the plurality of functions of the third-party application. In some embodiments, the guarding system modifies the at least one function of the plurality of functions of the third-party application by disabling access to the at least one function. Such aspects allow for increased security of accounts associated with the third-party application and the computing device.

In some embodiments, while the operating system of the computing system is operating in the non-guarded mode, the guarding system provides for display an icon for the third-party application. The guarding system receives a first input selecting the icon for the third-party application and provides for display a plurality of data items related to the third-party application.

In some embodiments, while the operating system of the computing device is operating in the guarded mode, the guarding system continues to provide for display the icon for the third-party application. The guarding system receives a second input selecting the icon for the third-party application and provides for display a subset of the plurality of data items related to the third-party application. In some implementations, the guarding system provides for display the subset of the plurality of data items related to the third-party application by preventing display of confidential data of at least one user account associated with the third-party application, wherein the confidential data is displayed in the non-guarded mode based on the first input. Such aspects allow the guarding system to prevent other people who are using the computing device from accessing confidential data associated with the user associated with the computing device. Such aspects also allow the guarding system to prevent other people using the computing device from performing actions on the computing device that the user associated with the computing device does not want, such as transferring money to an unknown account.

In some embodiments, the guarding system provides for display, while the operating system is operating in the non-guarded mode, an icon for the guarded mode of the computing device. In response to receiving a user interface selection of the icon, the guarding system accepts user inputs regarding guarded mode settings and preferences. In response to causing the operating system of the computing device to transition from the non-guarded mode to the guarded mode, the guarding system prevents display of the icon for the guarded mode of the computing device. Such aspects allow for the guarding system to provide the guarded mode such that when a person other than the user uses the computing device while it is in the guarded mode, such other person is not likely to suspect that the computing device is in the guarded mode or has the capability to be in the guarded mode.

In some embodiments, while in the guarded mode, the guarding system determines a security level of the guarded mode based on a type of the received user input. The received user input may be received via at least one hardware element of the computing device, e.g., a lock button of a smartphone. For example, the guarding system determines that the user associated with the computing device is requesting the operating system to operate in a low-level guarded mode because the received user input of three clicks of the lock button of the computing device (which may have been previously set, either based on user input or automatically, as the triggering input to initiate the guarded mode), or any other suitable input, or any combination thereof, may trigger entry of the guarded mode, or a certain level thereof. In another example, the guarding system determines that the user associated with the computing device is requesting the operating system to operate in a high-level guarded mode because the received user input is four clicks of the volume button and the lock button of the computing device simultaneously (which may have been previously set, either based on user input or automatically, as the triggering input to initiate the guarded mode). Such aspects allow the guarding system to operate at multi-tiered levels of security based on the situation, e.g., as indicated by a particular type of user input. For example, a user allowing their mother to temporarily use their computing device to view photos might be assigned a lower level of security than a user allowing a stranger to borrow the computing device associated with the user, such as to make a telephone call.

In some embodiments, the guarding system determines that the determined security level of the guarded mode exceeds a threshold. For example, the guarding system determines that the highest level of security has been requested. In response, the guarding system causes at least one of ambient audio, or an image of an ambient environment to be captured for a particular period of time. Such aspects may provide security if the user associated with the device is in distress, e.g., coerced into giving their smartphone to a mugger. The captured audio or image data may be sent directly to local emergency services. The highest level of security may trigger emergency services to be notified that an emergency event is occurring with respect to the user associated with the triggered computing device.

In some embodiments, the user input received at the computing device is a first user input, and the at least one attribute of the third-party application is in an original state while the operating system is operating in the non-guarded mode. The guarding system receives, while the operating system is operating in the guarded mode, a second user input. For example, the guarding system receives a press of the lock button and volume button simultaneously held for four seconds. The guarding system determines whether the received second user input matches a user input configured to initiate the non-guarded mode of the operating system. In response to determining that the received second user input matches the user input configured to initiate the non-guarded mode, the guarding system causes the operating system to transition from the guarded mode to the non-guarded mode. While in the non-guarded mode, the guarding system causes the at least one modified attribute of the third-party application to revert to the original state.

In some embodiments, the guarding system receives the user input at the computing device by receiving at least one biometric input from a user associated with the computing device. For example, a user unlocks their smartphone with their right thumb but initiates the guarded mode with their left thumb. Such aspects allow for the computing device to discretely transition to the guarded mode without other users in the area suspecting that the computing device has been transitioned to operate in a guarded mode.

In some embodiments, the operating system of the computing device comprises a kernel. When activated through customizable triggers such as a button press, biometric gesture, geofencing, scheduling, or a combination thereof, the device may be placed into a "guarded mode" state which raises an OS-level kernel flag, altering the behavior of applications and connected services. The guarding system may cause the operating system of the computing device to transition from the non-guarded mode to the guarded mode by modifying a guarded mode flag stored in memory associated with the kernel. For example, the guarding system may determine a security level of the guarded mode based on the received user input. The guarding system may modify the guarded mode flag stored in the memory associated with the kernel based on the determined security level. The guarding system may receive, via an application program interface (API) of the computing device, a query for a status of the guarded mode flag. In response to the API returning a data structure that indicates that the guarded mode flag has been triggered, the guarding system may modify the at least one attribute of the third-party application. In some embodiments, the guarding system modifies the at least one attribute of the third-party application in response to receiving a query, via the API, for a status of the determined security level of the guarded mode flag. In some embodiments, for any applications (or only certain applications) impacted by a transition to guarded mode (or to all applications installed on the computing device), a push notification may be provided to such applications, indicative of the change to guarded mode. In some embodiments, the query received via the API may not specifically request a status of the guarded mode flag, but instead may be an API call to perform some functionality that may be restricted based on the guarded mode flag. For instance, a banking app may transmit a call, instruction, or request to utilize a network interface to transfer and/or receive information, and, based on the application and/or the requested functionality, the kernel and/or operating system may be configured to check for the guarded mode flag status prior to enabling the requested functionality.

In some embodiments, the computing device is a first device, and the guarding system identifies a second computing device associated with the first computing device. The operating system and the third-party application may be installed on the second computing device. The guarding system may determine a security level of the guarded mode for the first computing device based on a type or functionality of the first computing device. The guarding system may determine a security level of the guarded mode for the second computing device based on a type or functionality of the second computing device. For example, a user is associated with a smartphone and a smart television. For example, the guarding system may determine that the guarded mode of the smartphone has a higher security level than the guarded mode of the smart television. In response to determining that the received user input matches the user input configured to initiate the guarded mode, the guarding system may cause the operating system on the first computing device and the second computing device to transition from the non-guarded mode to the guarded mode. The guarding system may modify the at least one attribute of the third-party application at the first computing device based on the determined security level of the first computing device and at the second computing device based on the determined security level of the second computing device. Depending on the security tier activated, in some embodiments, the disclosed embodiments may perform techniques such as concealing or restricting specific apps, signaling connected services to modify their behavior, or initiating covert audio and video recordings. In some embodiments, the aspects disclosed herein provide for a multi-tiered security feature integrated at the operating system (OS) level of consumer electronic devices (e.g., smartphones, tablets, laptops).

In some embodiments, the third-party application referenced, for instance, above, is a first third-party application, a second third-party application is also installed on the computing device, and the second third-party application is configured to have one or more attributes while the operating system of the computing device is operating in the non-guarded mode. For example, a smartphone has the Chase Mobile® app and the Instagram® app installed and the Instagram® app has the attribute of following other Instagram® accounts while the operating system of the smartphone is in the non-guarded mode. In some embodiments, based on the operating system transitioning to the guarded mode, in addition to modifying the at least one attribute of the first third-party application, the guarding system maintains the one or more attributes of the second third-party applications. For example, while the operating system is operating in the guarded mode, the guarding system may disable sending money through the Chase Mobile® app but continues to allow the Instagram® app to follow other Instagram® accounts.

In some embodiments, the at least one attribute of the third-party application while the operating system of the computing device is operating in the non-guarded mode comprises a first attribute and a second attribute. For example, while the operating system is operating in the non-guarded mode, the Chase Mobile® app can send money to other users and receive check deposits. Based on the operating system transitioning to the guarded mode, the guarding system may modify the at least one attribute of the third-party application by modifying the first attribute and maintaining the second attribute. For example, while the operating system is operating in the guarded mode, the guarding system disables the Chase Mobile® app from sending money to other users but continues to allow the Chase Mobile® app to receive check deposits.

In some embodiments, the user input may be received while the computing device is in an unlocked state in which a home screen is displayed, the home screen comprising a plurality of icons of third-party applications. In some embodiments, the computing device enters the unlocked state in response to receiving, while in a locked state in which no icons of third-party applications are displayed, input authenticating a user of the computing device. For example, a smartphone enters an unlocked state in response to receiving, while in a locked state, a PIN which authenticates a user of the smartphone.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
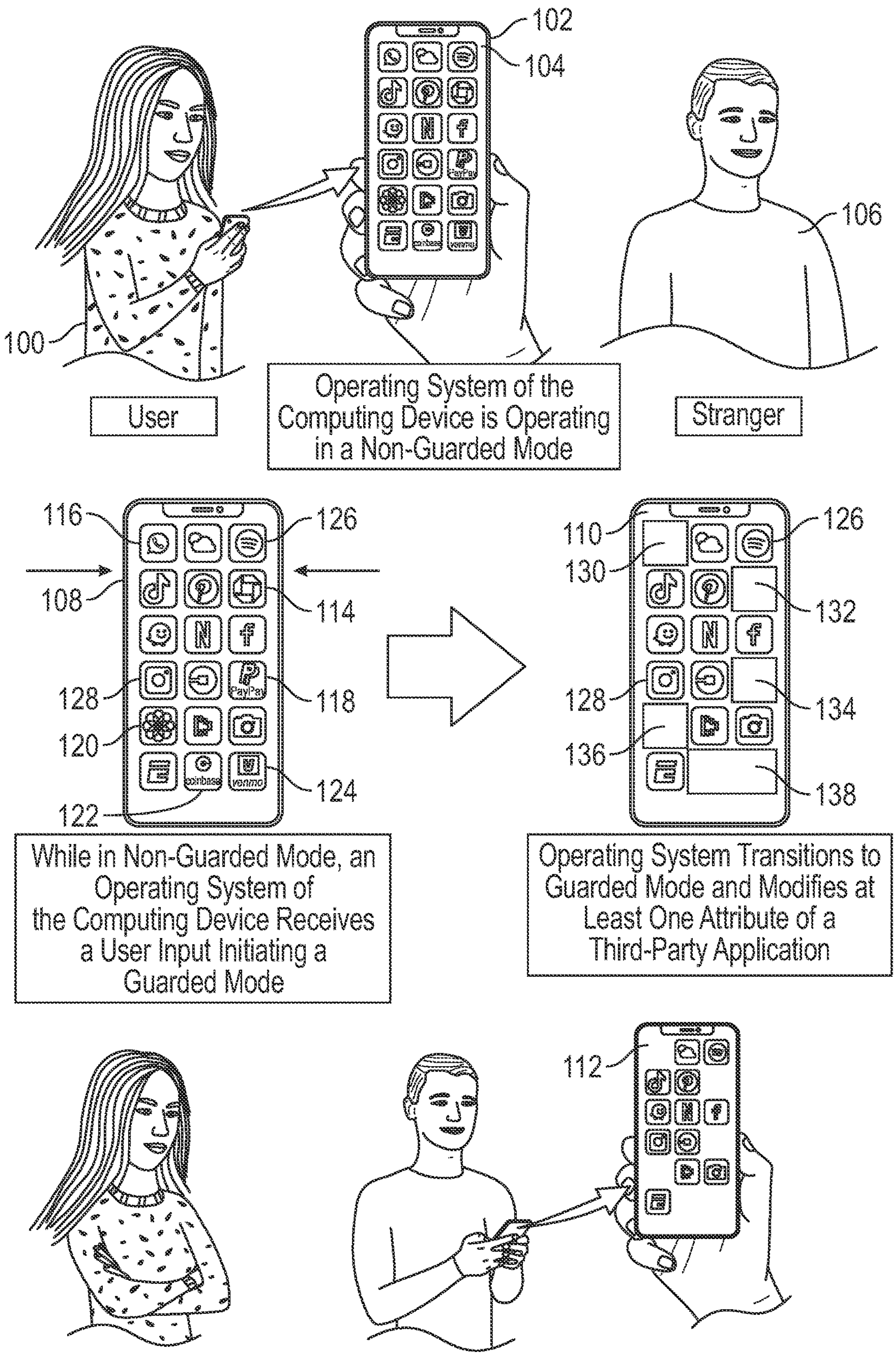
FIG. 1 shows an illustrative example of providing a guarded mode, for an operating system of a computing device, configured to remove an icon for a third-party application, in accordance with some embodiments of this disclosure.
Figure 4:
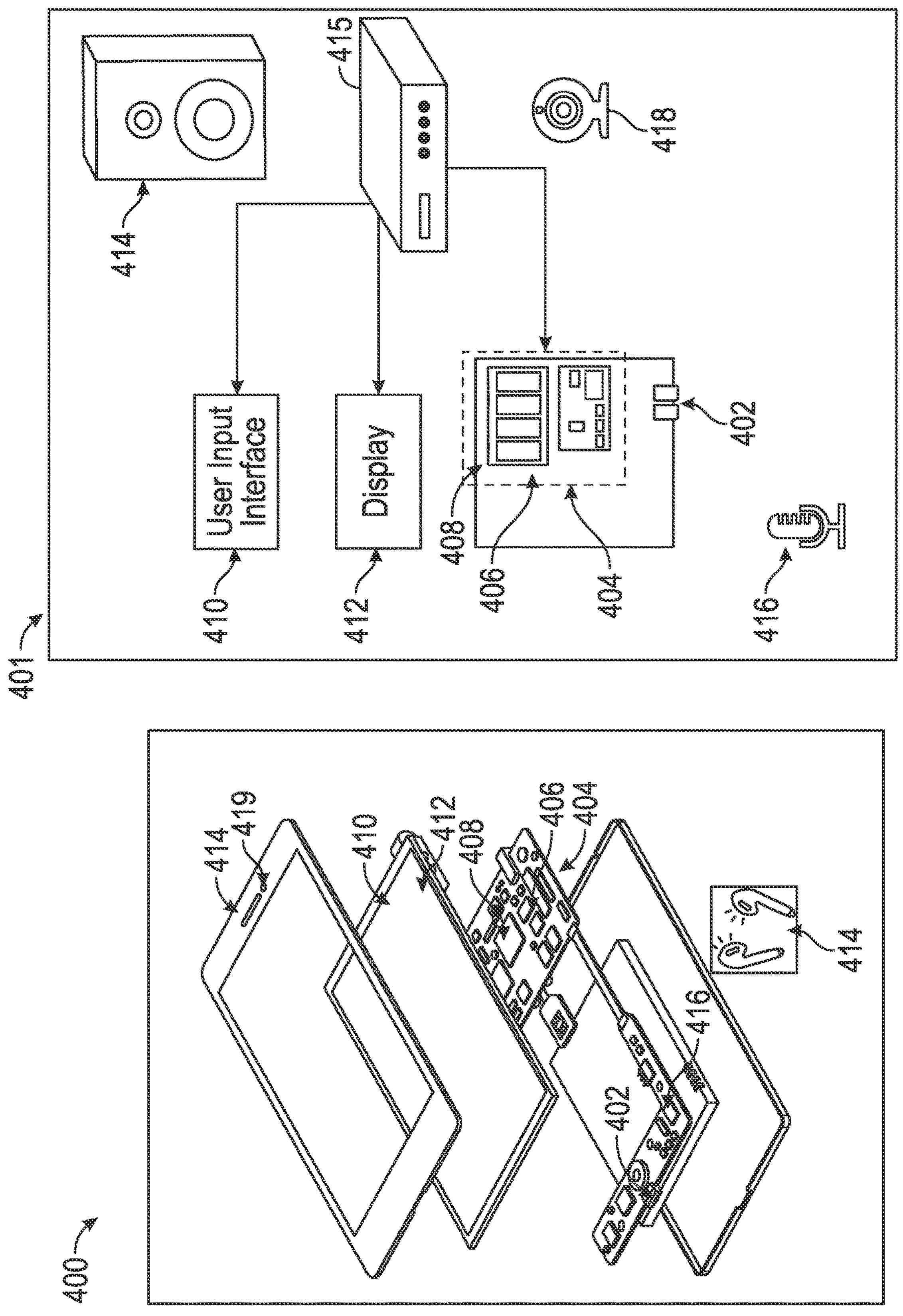
FIG. 4 depicts illustrative devices, systems, servers, and related hardware for providing a guarded mode for an operating system of a computing device, in accordance with some embodiments of this disclosure.
Figure 5:
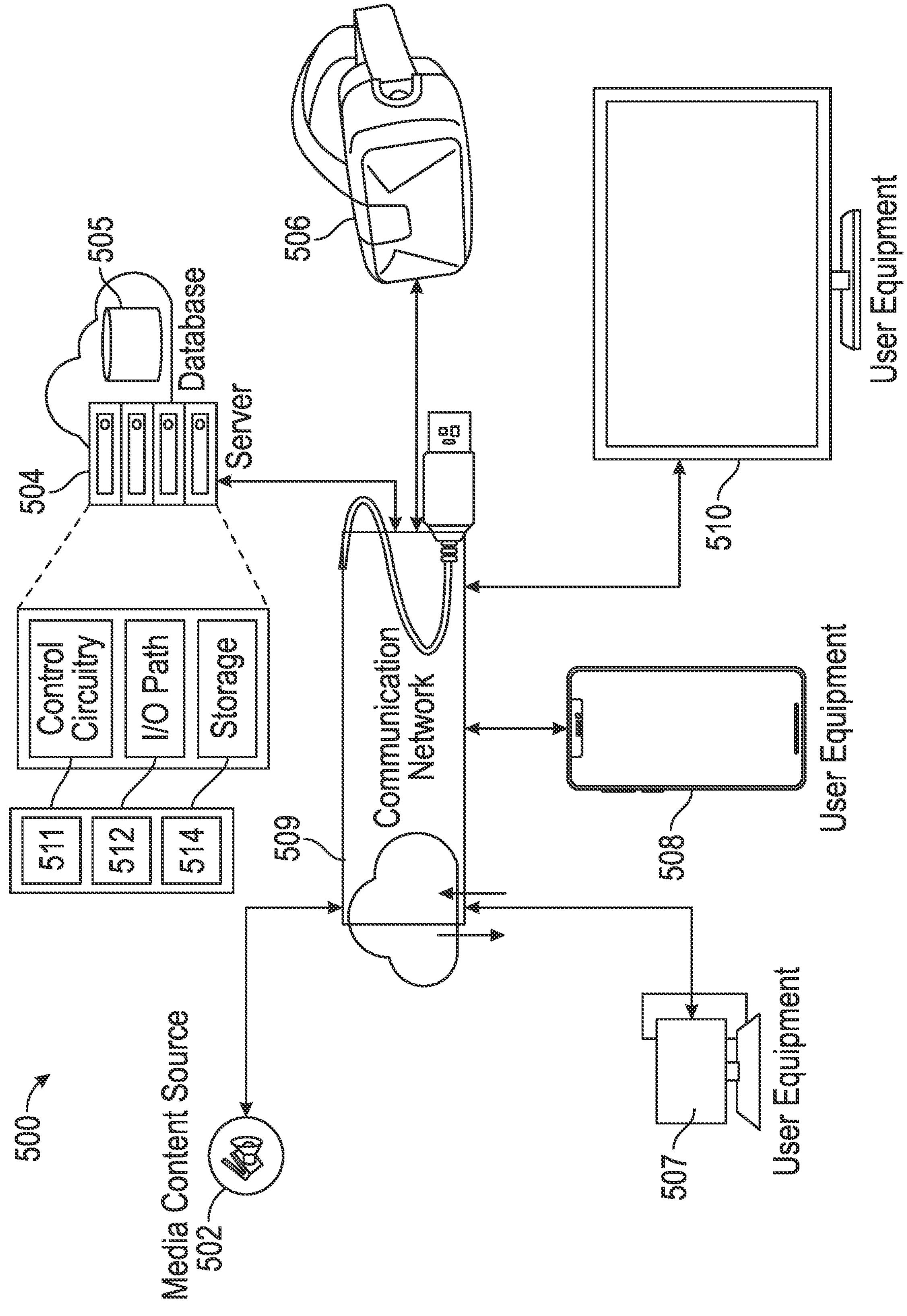
FIG. 5 depicts illustrative devices, systems, servers, and related hardware for providing a guarded mode for an operating system of a computing device, in accordance with some embodiments of this disclosure.

FIG. 1 shows an illustrative example of providing a guarded mode, for an operating system of a computing device, configured to remove an icon for a third-party application, in accordance with some embodiments of this disclosure. The guarding system may be configured to perform the functionalities described herein. In some embodiments, the guarding system may be provided by, or otherwise integrated in, an operating system (OS) of computing device 102. In some embodiments, the guarding system may comprise a guarding application installed at or otherwise provided (e.g., by server 504 of FIG. 5 over a network) to a particular computing device, may be provided via an application programming interface (API), and/or may be provided as an add-on application to another platform or application. In some embodiments, software tools (e.g., one or more software development kits, or SDKs) may be provided to any suitable party, to enable the party to implement the functionalities described herein. In some embodiments, the guarding system may comprise a guarding application running at least in part on computing device 102 and/or one or more remote servers (e.g., server 504 of FIG. 5) and/or databases and/or any other suitable computing devices. In some embodiments, the guarding application may be provided by the OS and/or may be understood as middleware or application software or any combination thereof. The OS may be operable to initialize and control various software and/or hardware components of the computing device. The guarding system may comprise any suitable number of networks, any suitable number of displays, sensors or devices, or any other suitable software and/or hardware components, or any combination thereof. In some embodiments, computing device 102 may correspond to user equipment 400, 401 shown in FIG. 4, and/or user equipment 506, 507, 508, 510 as shown in FIG. 5.

In some embodiments, computing device 102 may correspond to (or be included as part of) a head-mounted computing device; a mobile device such as, for example, a smartphone or a tablet; a desktop computer; a laptop computer; a tablet; a smart watch or wearable device; smart glasses; a smart television; a display device; a projector; a stereoscopic display; a wearable camera; a vehicle, automobile, or car; extended reality (XR) glasses; XR goggles; an XR head-mounted display (HMD); a near-eye display device; any other suitable computing device; or any combination thereof. XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such an environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world, or the real world is otherwise connected to virtual objects.

As shown in FIG. 1, a user 100 operates, and is associated with, a computing device 102. For example, user 100 may be a registered user of computing device 102, e.g., user 100 may be the sole owner, a co-owner, or other authorized user of computing device 102, and may have set up the device using their username, email and/or using any other suitable information. Computing device 102 may have at least one third-party application, e.g., the Chase Mobile® app, and at least one OS, e.g., iOS, installed thereon, or otherwise provided thereto. The OS of computing device 102 is configured to operate in a guarded mode or a non-guarded mode. The OS operating in the non-guarded mode corresponds to, e.g., the OS operating in a normal and expected manner without additional restrictions on data access. In some embodiments, the guarding system comprises multiple interrelated components that cooperate to provide for the functionality of the guarded mode, such as, for example, an OS kernel (e.g., OS kernel 605 in FIG. 6), a user interface layer (e.g., user interface layer 601 in FIG. 6), a trigger detection engine (e.g., trigger detection engine 603 in FIG. 6), a guarded mode controller (e.g., guarded mode controller 607 in FIG. 6), and/or an API (e.g., associated with a third-party application 609 in FIG. 6) for third-party applications. The kernel is a program run by the OS that resides in memory of the computing device and controls interactions between hardware and software components of the computing device. In some embodiments, the OS may be, for example, iOS, Android, Windows, Linux, or any other suitable OS, or any combination thereof. The third-party application is configured to have at least one attribute while the operating system of the computing device is operating in the non-guarded mode. For example, such attribute may be providing for display icon 114 for the guarded mode of the computing device. When a computing device 102 receives a user interface selection (at user interface 104) of the icon for the guarded mode of the computing device, an application with data associated with the guarded mode is launched.

In some implementations, the at least one attribute of the third-party application comprises providing an icon 114 for the third-party application. For example, computing device 102 generates for display user interface 104, which comprises icon 114 for the Chase Mobile® app, while the OS of computing device 102 is operating in the non-guarded mode. When computing device 102 receives a user interface input selecting the icon for the third-party application, the third-party application launches at the computing device. For example, when computing device 102 receives a user interface selection of the icon for the Chase Mobile® app at user interface 104, the Chase Mobile® app launches. While the OS of the computing device 102 is operating in the non-guarded mode, the guarding system provides for display a plurality of data items related to the third-party application. For example, while iOS of computing device 102 is operating in the non-guarded mode, upon the Chase Mobile® app launching (e.g., based on receiving user input selection of icon 114), the guarding system provides for display data items, e.g., account balances, user interface options, the date, etc.

In some embodiments, the at least one attribute of the third-party application corresponds to providing a plurality of functions while the OS of the computing device is operating in the non-guarded mode. For example, while the OS of computing device 102 is operating in the non-guarded mode, the Chase Mobile® app may be capable of providing many functions, such as transferring money, providing a portal to view personal data, viewing account balances, investing money, transmitting payments for mortgages and/or credit cards, and/or other suitable functions. In some implementations, the guarding system receives a user input at user interface 104 of computing device 102 while the OS is in the non-guarded mode via at least one hardware element of the computing device. For example, computing device 102 might be running a version of iOS that implements the guarding system, and may receive user input 108, e.g., user 100 simultaneously pressing the volume button and the lock button of computing device 102 twice in a row. User input 108 may be received via any suitable input, e.g., as voice input, tactile input, input received via a keyboard or remote, input received via a touchscreen, text-based input, biometric input, or any other suitable input, or any combination thereof. User input 108 may be received while computing device 102 has a home screen displayed at its user interface (i.e., a plurality of icons for third-party applications are displayed), or while computing device has a lock screen displayed at its user interface (i.e., no icons for third-party applications are displayed).

In some embodiments, the guarding system determines whether the received user input matches a user input configured to initiate the guarded mode of the OS of the computing device. In some embodiments, an OS of a computing device preconfigures a user input configured to initiate the guarded mode of the OS of the computing device. For example, the OS of computing device 102 may be preconfigured (e.g., based on a setting hard coded or otherwise provided by the entity providing the OS) to initiate the guarded mode of the OS upon receiving a user input of the volume button and the lock button of computing device 102 being pressed simultaneously twice in a row, or upon receiving any other suitable input, or any combination thereof. In some embodiments, computing device 102 receives (at 108) a user interface selection or performance of a user input and/or user input pattern that is to be used to initiate the guarded mode of the OS of the computing device. For example, the guarding system receives, via user interface 104 of computing device 102, a selection from user 100 specifying that the user input that is to initiate the guarded mode of the OS of computing device 102 is the volume button and the lock button of computing device 102 being pressed simultaneously twice in a row. In some embodiments, such user input may be received via a settings interface associated with the guarded mode and/or OS of computing device 102.

In some embodiments, the guarding system provides an adaptive user interface to obfuscate its activation from unauthorized users, and techniques for indicating higher levels of guarded states through unique combinations of button presses and biometrics. For example, a specific facial expression during Face ID®, or a double-click of a hardware button before using biometric authentication, could initiate a high-level guarded mode. The guarding system may be configured to activate a low-level guarded mode through a suitable user input(s), e.g., via a quick settings menu accessible via a swipe gestures. Once activated, the guarded mode option may be hidden from the quick settings menu to prevent unauthorized users from knowing about its existence. When guarded mode is deactivated, the guarded mode setting may reappear within the quick settings menu. The combination of button presses, biometrics, and quick menu settings guarded mode enables a privacy- and safety-focused operating state of the device in which specific user-defined triggers may alter system behaviors to provide enhanced privacy and security.

In some embodiments, user input 108 configured to initiate the guarded mode of the OS of the computing device is a biometric input from a user associated with the computing device. For example, user input 108 that initiates the guarded mode of iOS of computing device 102 may correspond to the guarding system determining that user 100 has unlocked computing device 102 with his or her left thumb instead of his or her right thumb, since such fingerprints are distinct from each other. The regular and opposite thumbprints may be stored in the memory of the computing device, which the guarding system may access to determine whether user input 108 is a request to initiate the guarded mode. In some embodiments, the guarding system receives IMU data from an IMU sensor of computing device 102 and determines, based on the IMU data, that computing device 102 was exchanged from a right hand to a left hand or vice versa. The guarding system may determine that the user of computing device 102 intends for the opposite hand-use to trigger the guarding system and initiate the guarded mode. In some embodiments, based on the received IMU data, the guarding system determines that computing device 102 was given to another user and, in response, initiate the guarded mode. As another example, the guarding system may initiate the guarded mode in response to detecting that user 100 is requesting to unlock computing device 102 with a distressed facial expression (e.g., detected via an image sensor or other sensor of computing device, and subsequently analyzed and classified by the guarding system), or is requesting to unlock computing device 102 via one or more of any other suitable facial expressions. In some embodiments, the guarding system activates or deactivates the guarded mode automatically based on determining that a current geographic location of the computing device 102 matches a particular geographic location (e.g., whether user 100 is at home or is at a public place, in a dangerous neighborhood, in a foreign country, a house where parents of user 100 live, or any other suitable location, or any combination thereof) or a predefined schedule (e.g., between 8:00 PM and 6:00 AM, or any other suitable time or time period). In some embodiments, a wearable (e.g., a smart watch) may be associated with computing device 102, and, for example, user 100. The guarding system may analyze a proximity of the wearable to computing device 102. For example, if the guarding system determines that a distance between the wearable and computing device 102 has increased (e.g., to reach a threshold distance from computing device 102), indicating that a user (e.g., user 106) different from user 100 may be in possession of computing device 102. For example, the guarding system may determine a signal strength of a signal transmitted between computing device 102 and the wearable, and determine the distance (and/or a change in distance at different times) based on variations in the signal strength. In some embodiments, the guarding system may receive this data indicative of the distance between computing device 102 and the wearable and, in response, may transition the OS to the guarded mode, e.g., if the distance suddenly changes, or increases to greater than a threshold distance.

In some embodiments, the guarding system determines that the received user input matches the user input configured to initiate the guarded mode of the OS of the computing device. For example, the guarding system of computing device 102 determines that the received one or more user inputs 108, e.g., the simultaneous pressing of the volume button and the lock button twice in a row, matches the stored one or more user inputs (e.g., stored at storage 408) configured to initiate the guarded mode of the OS of computing device 102. In response to determining that the received user input matches the user input configured to initiate the guarded mode of the OS of the computing device, the guarding system may cause the OS of the computing system to transition from the non-guarded mode to the guarded mode. The guarding system may modify a guarded mode flag stored in memory (e.g., storage 408 of FIG. 4) of computing device 102 associated with the kernel of the OS. The guarding system may modify the at least one attribute of the third-party application by receiving a query, via an application program interface (API), for a status of the guarded mode flag. For example, the Chase Mobile® app queries the guarding system, via the API of computing device 102, for the status of the guarded mode flag. As shown in FIG. 1, the received user input to trigger the guarded mode may be received while computing device is in an unlocked state (e.g., after computing device 102 receives entry, at a lock screen, of a correct PIN code or pass code to access the home screen), and the computing device may remain in the unlocked state after transitioning to the guarded mode. In some embodiments, the received user input (e.g., a long press of a button) to trigger the guarded mode may be received while at least one application icon (e.g., 116, 126, 128, 114, etc.) is being displayed, e.g., such as based on one or more inputs which otherwise may not cause any significant change in the operation of computing device 102, but may be configured to trigger the guarded mode, rather than via a settings menu. Alternatively, the received user input to trigger the guarded mode may be received via a settings menu, e.g., as an explicit request to enter the guarded, such as by selecting an "enter guarded mode" option. In some embodiments, the input to trigger the guarded mode may be received while computing device 102 is in a lock screen state (e.g., prior to receiving authenticating input to reach the home screen), and the transition to the guarded mode may be carried out while in the lock screen state, or the transition to the guarded mode may be carried out in response to computing device 102 being unlocked via authentication.

In some embodiments, the guarding system generates for display a notification at the display screen of the computing device that the OS has begun operating in the guarded mode. The guarding system may display the notification for a particular period of time before disappearing. For example, in response to determining that user input 108 matches a user input configured to initiate the guarded mode of the OS of computing device 102, the guarding system generates for display a confirmation message, e.g., "Guarded mode entered." The confirmation message may cease being displayed at user interface 104 of computing device 102 after a particular period of time, e.g., two seconds. In some implementations, in addition or in the alternative to the notification indicating the guarding system has caused the OS to enter the guarded mode, the guarding system alters the visual appearance of the background of user interface 104 of computing device 102 to indicate that the OS has begun operating in the guarded mode. For example, in response to determining that user input 108 matches a user input configured to initiate the guarded mode of the OS of computing device 102, the guarding system replaces the regular home screen wallpaper with an, e.g., orange wallpaper (or any other suitable wallpaper), and/or otherwise modifies a background theme, to indicate to an owner or primary user of computing device 102 that computing device 102 is now operating in the guarded mode. Such aspects allow the user associated with the computing device to be assured that the OS of his or her computing device 102 is operating in the guarded mode before the user lets another person use his or her computing device.

In some implementations, based on the OS transitioning to the guarded mode, the guarding system modifies the at least one attribute of the third-party application. For example, the guarding system of iOS of computing device 102 prevents display of icon 114 for the Chase Mobile® app. In some embodiments, the guarding system may continue display of all other icons for third-party applications. In some embodiments, the guarding system prevents display of icons for a plurality of third-party applications. For example, the guarding system of iOS of computing device 102 prevents display, as indicated by the empty boxes at user interface 110, of a plurality of icons for third-party applications (e.g., icons 114, 116, 118, 120, 122, and 124 on display at user interface 104) while continuing to display icons for other third-party applications (e.g., icons 126 and 128). In some embodiments, boxes 130, 132, 134, 136, and 138 at user interface 110 respectively indicate where icons 114, 116, 118, 120, 122, and 124 were displayed by the guarding system in the non-guarded mode, prior to transitioning to the guarded mode. For example, the location of box 130 indicates where icon 116 was displayed by the guarding system in the non-guarded mode; the location of box 132 indicates where icon 114 was displayed by the guarding system in the non-guarded mode; the location of box 134 indicates where icon 118 was displayed by the guarding system in the non-guarded mode; the location of box 136 indicates where icon 120 was displayed by the guarding system in the non-guarded mode; and the location of box 138 indicates where icon 122 and icon 124 were displayed by the guarding system in the non-guarded mode. In some embodiments, the guarding system may, while in the guarded mode, modify text and/or a visual appearance associated with an icon for a particular third-party application, to disguise the nature of data that may be accessible via such third-party application. For example, while in the guarded mode, the guarding system may replace icon 114 of the Chase Mobile® app with a generic blue square with the letter "C" in the middle.

The guarding system may prevent display of icons for one or more third-party applications that were previously specified (e.g., via user interface selections) as applications that should be hidden while the OS of the computing device is operating in the guarded mode. For example, the guarding system may have received a user interface selection, from user 100 via user interface 104 of computing device 102, to prevent display of the icon for the Chase Mobile® app while iOS of computing device 102 is operating in the guarded mode. Thus, the guarding system may prevent display of the icon for the Chase Mobile® app while continuing to display one or more icons for the other third-party applications installed on computing device 102. Such aspects protect the financial data of user 100 because another user, e.g., user 106, that is using computing device 102 is prevented from being presented with icon 114 that (in the non-guarded mode) is selectable to access the Chase Mobile® app, and/or is otherwise prevented from accessing the Chase Mobile® app (e.g., the guarding system may place such app in a private folder that is inaccessible during guarded mode or is accessible only upon entry of a particular passcode), or any combination thereof.

In some embodiments, the guarding system may prevent display of icons for each third-party application, or each of one or more categories of third-party applications (e.g., finance, messaging, photos, or any other suitable category, or any combination thereof), that comprises confidential data associated with user 100 associated with computing device 102, e.g., automatically without receiving explicit user input, or may recommend which third-party applications (or data or functions associated therewith) should be modified in the guarded mode. In some embodiments, the guarding system analyzes metadata (or any other suitable data) associated with the third-party applications installed on the computing device to determine which of the third-party applications comprise confidential data. For example, the guarding system may determine that third-party applications with metadata tags "financial," and/or "banking" comprise private data associated with the user associated with computing device 102, and therefore that icons of such applications should not be provided for display while the OS is operating in the guarded mode. If the guarding system detects confidential data within a third-party application that has not been pre-selected by user interface selection to have the icon hidden, the guarding system may still prevent display of the icon of the third-party application in order to protect the privacy of the user associated with computing device 102. For example, the guarding system of iOS of computing device 102 may detect that other third-party applications, e.g., WhatsApp®, PayPal®, Photos, Coinbase®, and Venmo®, also contain confidential data. Thus, the guarding system may prevent display of the icons for these third-party applications in addition to preventing display of the Chase Mobile® app, as shown at user interface 110. When user 106 uses computing device 102, after user input received from user 100 has caused the guarding system to trigger the guarded mode via user input 108, computing device 102 may provide for display user interface 110, which hides or prevents display of the icons of third-party applications that comprise confidential data. While FIG. 1 shows boxes 130, 132, 134, 136, and 138 representing locations at which empty spaces are located (e.g., where icons 120, 122, 124, 118, 114, and 116 were previously displayed in the non-guarded mode), in some embodiments, the guarding system may be configured to automatically realign or reorganize the remaining icons of the third-party application, e.g., icons 126, 128, and other icons which continue to be displayed at user interface 112 in the guarded mode, such that the spacing between icons displayed at user interface 112 remains consistent regardless of whether the OS is operating in the guarded mode or the non-guarded mode. For example, the empty spaces indicated at boxes 130, 132, 134, 136, and 138 may not be present in user interface 112 when the OS is operating in the guarded mode, and instead the locations of the remaining icons for the third-party applications in the guarded mode may be modified to give the appearance that computing device 102 is functioning normally, e.g., in the non-guarded mode.

In some embodiments, while the OS of the computing device is operating in the guarded mode, the guarding system prevents display of the icon for the third-party application at a main menu and/or home screen of computing device 102. For example, in a non-guarded mode, the guarding system may display the icon for the third-party application in a detailed menu of icons for all third-party applications installed at computing device 102, and/or the guarding system may display the icon for the third-party application in response to a user search input. In some embodiments, while the OS of the computing device is operating in the guarded mode, the guarding system prevents the icon for the third-party application from being displayed as a search result in response to a user search input for the third-party application. For example, while iOS is operating in the guarded mode, a mugger who cannot find the icon for the Chase Mobile® app at computing device 102 tries to search for "Chase" in the search bar provided by iOS. However, the guarding system prevents display of a search result for the Chase Mobile® app. In some embodiments, the guarding system moves display of the icon for the third-party application to a private folder requiring additional user authorization.

In some implementations, upon activation of the guarded mode, the guarding system provides for display false battery information. For example, the guarding system provides for display a pop-up notification at a user interface of computing device 102 which displays a battery-related message, e.g., "Low-power mode." In some embodiments, the guarding system stops providing for display the false battery information after a particular period of time (e.g., five minutes, or any other suitable period of time). In some embodiments, an amount of time for the particular period of time is set in advance via user interface selections or by the OS of computing device 102. In some embodiments, the guarding system detects sensitive images, via image processing and/or audio processing and/or processing of text, in the photo gallery (or stored in association with any other suitable application) of computing device 102. For example, the guarding system may utilize one or more computer-implemented techniques, e.g., machine learning and/or heuristic techniques, to identify images likely to contain sensitive content. In some embodiments, the guarding system may identify objects in a particular image by performing image segmentation (e.g., semantic segmentation and/or instance segmentation) on the image to identify, localize, distinguish, and/or extract the different objects, and/or different types or classes of the objects, or portions thereof, of the image. Any suitable number or types of techniques may be used to perform such segmentation, such as, for example: machine learning, computer vision, object recognition, pattern recognition, facial recognition, image processing, image segmentation, edge detection, color pattern recognition, partial linear filtering, regression algorithms, and/or neural network pattern recognition; or any other suitable technique, or any combination thereof. For example, if a sensor of computing device 102 detects a face that is not the face of the user that owns computing device 102, the guarding system determines that the computing device is in the hands of a different user, and may automatically transition the operating system into the guarded mode. In some embodiments, objects may be identified by extracting one or more features for a particular object and comparing the extracted features to those stored locally and/or at a database or server storing features of objects and corresponding classifications of known objects (e.g., likely to be considered private or confidential). In some embodiments, the guarding system may determine that a photo album with a particular title, e.g., "private," or "bachelor party in Cancún," is likely to contain private or sensitive content, and may prevent access to such content while the OS is operating in the guarded mode. For example, in response to detecting that certain data is likely to be sensitive or confidential with respect to user 100, the guarding system may hide the sensitive images (or other data) while the OS is operating in the guarded mode, and/or recommend at user interface 104 of computing device 102 that such data should be hidden while the OS is operating in the guarded mode.

In some embodiments, the guarding system enables the guarded mode to be initiated based on receiving any of a plurality of different inputs. In some embodiments, each of the plurality of different inputs is associated with a different security level. In some embodiments, a combination of hardware actions such as button presses used in combination with or within a determined time in conjunction with a biometric or gesture may trigger a high-level of the guarded mode. As a non-limiting example, upon the guarding system of computing device 102 detecting input of a simultaneous pressing of a volume button and a lock button of computing device 102 twice in a row, the guarding system may determine that this user input corresponds to requesting initiation of a low security level of the guarded mode. In such low security level, the guarded mode may modify functions (or prevent access to certain data) of the third-party application(s) without completely disabling access to all functions (and/or all data) of third-party application(s). As another example, if the guarding system of computing device 102 detects input of a pressing of the lock button of computing device 102 three times in a row, the guarding system may determine that this user input corresponds to initiating a medium security level of the guarded mode. In such medium security level, the guarded mode may modify functions of the third-party application(s) such that all (or substantially all of) the functions of the third-party application are disabled while the OS of computing device 102 is in the guarded mode, and/or such that all (or substantially all of) the data associated with such application is disabled while the OS of computing device 102 is in the guarded mode.

In some embodiments, the guarding system determines that the determined security level of the guarded mode exceeds a threshold. As a non-limiting example, upon the guarding system of computing device 102 determining that a simultaneous pressing of the volume button and the lock button of computing device 102 for more than a particular period of time (e.g., six seconds or any other suitable period of time) has been received via user interface 104, the guarding system may determine that this user input corresponds to initiating a high security level. As another non-limiting example, if a user clicks or multi-clicks a specific or combination of hardware buttons just before unlocking their computing device with a code or via a biometric method such as Apple's FaceID®, the computing device may enter a high-level of the guarded mode indicating the user is under extreme duress. In response to determining that the determined security level of the guarded mode exceeds a threshold, the guarding system may cause at least one of ambient audio or images of an ambient environment to be captured for a particular period of time. For example, in response to determining that user input 108 corresponds to initiating a high security level, in addition to modifying functions of the third-party application(s) and display of the user interface of computing device 102, the guarding system records audio, video, and/or takes photographs for, e.g., ten minutes after receiving the user input. The guarding system may capture audio data via a microphone of the computing device, e.g., microphone 416 as shown in FIG. 4. The guarding system may capture images and/or videos via a camera of the computing device, e.g., camera 418 as shown in FIG. 4. In some embodiments, in response to determining that the determined security level of the guarded mode exceeds a threshold, the guarding system causes smart lights of the user's house to flash and/or turn a particular color. For example, the guarding system may automatically cause, or may recommend that, emergency services be contacted in response to determining a high-level security guarded mode, and such flashing lights and/or particular colored lights may help indicate to the emergency services which house requires attention.

In some embodiments, in response to determining that the determined security level of the guarded mode exceeds a threshold, the guarding system causes a lidar sensor (or other suitable sensor) of computing device 102 to scan the environment around computing device 102. For example, the guarding system may cause such sensor to capture environmental data such as a 3D view of the environment around computing device 102, size and distance measurements of nearby objects and people, any other suitable environmental data, or any combination thereof. In some implementations, the guarding system causes sensors of associated devices (e.g., IoT devices, home security systems, wearables, or any other suitable device, or any combination thereof) proximate to computing device 102 to scan the environment around computing device 102. In some embodiments, the lidar sensor may assist a camera of computing device 102, e.g., camera 418 as shown in FIG. 4, with focus and exposure levels. In response to determining that the determined security level of the guarded mode exceeds a threshold, the guarding system may notify emergency services that an emergency event is occurring to the user associated with the triggered computing device. In some embodiments, the captured ambient audio and/or image of the ambient environment is not locally stored at the computing device, but rather is directly sent to local emergency services. Such aspects allow for maximal security such that the user using the computing device that is not associated with the computing device (e.g., a mugger) can be identified and reported.

In some embodiments, the user input is a first input, and the at least one attribute of the third-party application is in an original state while the OS is operating in the non-guarded mode and is caused to be in a modified state while the OS is operating in the guarded mode. For example, while the OS of computing device 102 is operating in the non-guarded mode, the guarding system may cause the icon for the Chase Mobile® app to be displayed at user interface 104 and provide all its normal functions. While iOS of computing device 102 is operating in the guarded mode, for example, in response to the user input 108 triggering the guarded mode, the guarding system prevents display of the icon for the Chase Mobile® app and/or modifies its functions (e.g., by removing the ability to perform such functions, such as by graying out or declining to display options to perform such functions). In some embodiments, the guarding system receives, at computing device 102 while the OS of the computing device is operating in the guarded mode, a second user input. For example, while the OS is operating in the guarded mode, computing device 102 receives a second user input of a simultaneous pressing of the volume button and the lock button of computing device 102 four times in a row.

The guarding system may determine whether the received second user input matches a user input configured to transition back to the non-guarded mode of the OS of the computing device. In some embodiments, the user input configured to transition back to the non-guarded mode of the OS is a different input than the user input configured to transition the OS from the non-guarded mode to the guarded mode. The user input configured to transition the OS back to the non-guarded mode may be a hardware input, a user interface input, a voice command that matches the associated user's voice characteristics, an image from a camera of the computing device that matches an image of the associated user, a biometric scan from a biometric sensor that matches a biometric scan of the associated user, any other suitable user input, or any combination thereof. For example, while iOS is operating in the guarded mode, a user input of a simultaneous pressing of the volume button and the lock button of computing device 102 four times in a row triggers the OS to transition back to operating in the non-guarded mode. In some embodiments, the user input configured to transition the OS back to the non-guarded mode is the same user input configured to transition the OS from the non-guarded mode to the guarded mode.

In response to determining that the received second user input matches the user input configured to transition back to the non-guarded mode, the guarding system may cause the OS of the computing device to transition from the guarded mode to the non-guarded mode and may cause the at least one attribute of the third-party application to transition from the modified state back to the original state. For example, in response to the guarding system determining that the second received user input matches the user input configured to transition iOS back to the non-guarded mode, the guarding system transitions iOS of computing device 102 from the guarded mode back to the non-guarded mode. The guarding system, when iOS is back in the non-guarded mode, causes the icon of the Chase Mobile® app to once again be displayed at user interface 104 of computing 102. The guarding system, when iOS is back in the non-guarded mode, causes the functions of the Chase Mobile® app to be fully accessible.

In some embodiments, the guarding system, while the OS of the computing device is operating in the guarded mode, provides for display false contact information to replace existing contact information on the computing device. Such aspects allow the computing device to maintain a realistic display of contact information, while maintaining the privacy of the user associated with the computing device's contacts. For example, if a mugger is using a user's smartphone while the OS is operating in the guarded mode, the guarding system may cause contact information of one or more contacts stored at computing device 102 to be modified and therefore be false, thereby preventing the mugger from soliciting and eliciting information out of the user's contacts. In some embodiments, the false contact information redirects communication to a designated party (e.g., an emergency contact, ChatGPT, or any other suitable party, or any combination thereof). Such aspects help allow the fact that the OS in guarded mode to be less detectable to a mugger.

In some embodiments, the guarding system may replace one or more photos stored on computing device 102 with false photos, such as generic pictures that do not comprise data of user 100 associated with computing device 102 and/or generic pictures that the guarding system augments to comprise data of user 100 associated with computing device 102. Such aspects provide greater privacy for the user associated with the computing device, as well as help prevent the user associated with the computing device from being blackmailed or otherwise threatened with private photos. In some embodiments, contextual or user data is used to customize user interface 104 of the computing device with an OS operating in the guarded mode. For example, the guarding system of a smartphone associated with a younger user in Colorado, while its OS is operating in a guarded mode, provides for display a user interface comprising an icon for a crypto trading platform app and fake (e.g., computer-generated, and not captured) images of that user snowboarding or attending music festivals. In contrast, the guarding system of a tablet associated with an older user in Florida, while its OS is operating in a guarded mode, provides for display a user interface comprising an icon for PayPal® and faked photos of that user playing golf or mowing their lawn. Such aspects provide a less detectable use of the guarded mode.

In some embodiments, the user associated with the computing device specifies user interface changes to be made when specific users are detected via any suitable user authentication method (e.g., Face ID®). Such user-level specifications may be included in the guarded mode settings. For example, when a user hands his smartphone to an unknown mugger, the guarding system detects via face scanning that the smartphone is now in the hands of an unrecognized and unauthorized user. Thus, the guarding system prevents display of icons for payment apps and text chat history. In contrast, when the same user hands his phone to his mother, the guarding system detects via face scanning (or fingerprint scanning, or using any other suitable technique, or any combination thereof) that computing device 102 is now being used by a recognized and/or partially authorized user. Thus, the guarding system provides for display icons for payment apps while preventing display of text chat history.

In some embodiments, the guarding system, in response to receiving a user input configured to initiate a guarded mode of an OS of a computing device, activates a guarded mode of the OS across a plurality of associated computing devices. For example, if user 100 is logged in to the same user account across multiple devices, the guarding system, in response to receiving user input 108, activates a guarded mode not only at the OS of computing device 102, but also at the OS of associated computing devices. The security level of the guarded mode may depend on the type of associated device. For example, a smartphone may have a higher security level guarded mode than a smart television. In some embodiments, the security level of the guarded mode is determined based on at least one of the type or other attribute of the computing device itself; the functionality of the associated computing device; the third-party applications installed on the associated computing device; and/or the sensitive data that is accessible or retrievable via (or otherwise stored at) the associated computing device. For example, based on determining that a user's smartphone has Venmo® installed, but the user's tablet (e.g., associated with a same user profile) does not have Venmo® installed, the guarding system may set a higher security level for the smartphone than the tablet. As another example, a computing device provided for a user's employer may be assigned a higher security level than a computing device used primarily for entertainment purposes.

While the guarded mode has been described in the context of modifying an attribute of a third-party application in relation to the OS, in some embodiments, one or more attributes of a native application that is associated with a same entity as the OS (e.g., Apple®) may be modified in the guarded mode. For example, the guarding system may disable the ability to make phone calls or send text messages or perform any external communications on native applications and/or third-party applications. In some embodiments, disabling a function may correspond to disabling access to a user's viewing history on a media content-providing application while still allowing access to a media library of such application, or disabling access to web browsing history on a web browsing application while still allowing access to surf the web via the web browsing application.

In some embodiments, the guarding system implements the guarded mode in a car. For example, if a thief steals a user's car (e.g., a car that in a non-guarded mode might provide access to sensitive information such as the user's home address, financial information, past driving history, or any other suitable data), the user may initiate the guarded mode at the vehicle via an associated device such as computing device 102 of FIG. 1. For example, the guarding system, while the OS of the car is operating in the guarded mode, may disable access to particular, sensitive data and/or disable particular functions (e.g., disable driving of the vehicle at all, or disable driving of the vehicle at certain locations, such as, for example, across state lines)

Figure 2:
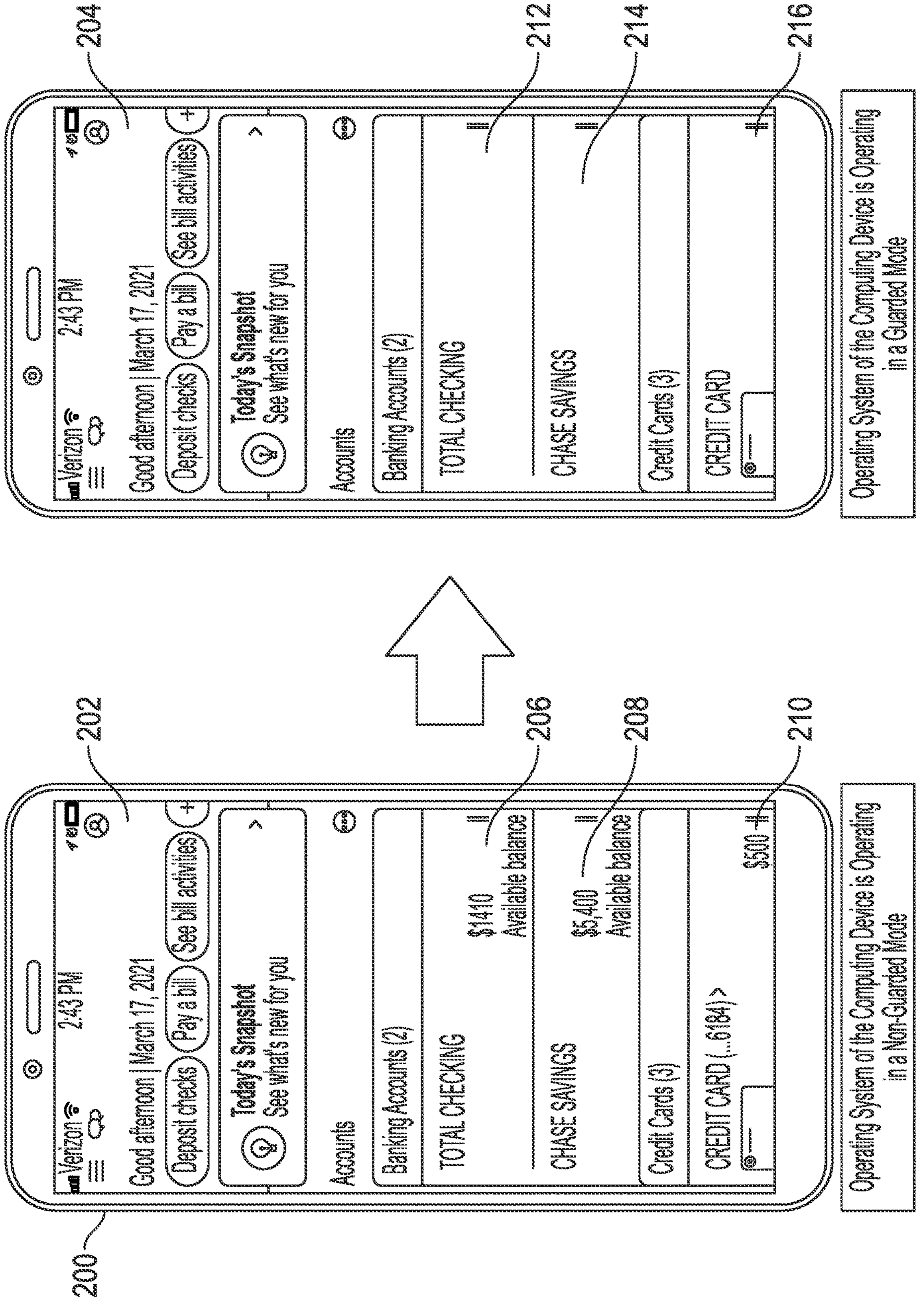
FIG. 2 shows an illustrative example of providing a guarded mode that hides display of confidential data of a third-party application, in accordance with some embodiments of this disclosure.

FIG. 2 shows an illustrative example of providing a guarded mode that hides display of confidential data, at user interfaces 202 and 204 of computing device 200, of a third-party application, in accordance with some embodiments of this disclosure. The OS of computing device 200 implements a guarding system as described above in connection with FIG. 1. Computing device 200 may correspond to computing device 102. In some embodiments, while the OS of computing device 200 is operating in the non-guarded mode, the guarding system receives a first input selecting an icon for a third-party application. For example, the guarding system receives, via a user interface selection at the user interface of computing device 200, e.g., a smartphone, a first input selecting the icon of the Chase Mobile® app. While the OS of the computing device is operating in the non-guarded mode, and upon the third-party application launching at computing device 200, the guarding system provides for display a plurality of data items related to the third-party application. For example, while iOS of computing device 200 is operating in the non-guarded mode, upon the Chase Mobile® app launching, the guarding system provides for display user interface 202, which comprises a plurality of data items, e.g., account balances 206, 208, and 210, user interface options, and the date.

In some embodiments, while the OS of the computing device is operating in the guarded mode, the guarding system continues to provide for display the icon for the third-party application. For example, while the OS of computing device 102 is operating in the guarded mode, the guarding system continues to provide for display the icon for the Chase Mobile® app. The guarding system receives a second input selecting the icon for the third-party application while the OS of the computing device is operating in the guarded mode. For example, the guarding system receives, via a user interface selection at the user interface of computing device 200, e.g., a smartphone, a second input selecting the icon of the Chase Mobile® app. While the OS of the computing device is in the guarded mode, the guarding system provides for display a subset of the plurality of data items related to the third-party application and prevents display of data items of the plurality of data items not included in the subset. In some embodiments, the guarding system prevents display of data items that have been selected by prior user interface selections. In some embodiments, the guarding system prevents display of data items that the guarding system detects comprise sensitive information regarding the associated user.

For example, while iOS of computing device 200 is operating in the guarded mode, upon the Chase Mobile® app launching, the guarding system provides for display user interface 204, which comprises a subset of the plurality of data items, e.g., user interface options and the date. The guarding system prevents display of data items not included in the subset, e.g., account balances 206, 208, and 210, and instead displays blank portions 212, 214, and 216. In some embodiments, the plurality of data items comprises confidential data of at least one user account associated with the third-party application. For example, account balances displayed at user interface 202 are confidential data of the Chase bank account that the Chase Mobile® app is logged in to. In some embodiments, the data items that the guarding system prevents for display are data items that comprise confidential data of the at least one user account associated with the third-party application. For example, account balances displayed at user interface 202 are confidential data of the Chase bank account that the Chase Mobile® app is logged in to, thus the guarding system prevents for display account balances at user interface 204. In some embodiments, while in the guarded mode, the guarding system prevents display of and/or access to a settings portion of the third-party application, which may in the non-guarded mode contain sensitive information such as bank routing number, social security number, home address, date of birth, or any other suitable information, or any combination thereof. In some embodiments, the guarding system may, in the guarded mode, cause fake account balance information to be displayed (e.g., numbers that do not reflect the actual account balance of user 100), and/or may enable a fake transaction and/or fake confirmation of a transaction to occur to appease a mugger (e.g., give the appearance that a money wire transfer was transmitted to the mugger, to enable user 100 to potentially be let go and escape by the time the mugger realizes the transaction was fake). For example, the guarding system, while in the guarded mode, may display a message "Zelle has sent money to . . . " to appease a mugger trying to send money to themself.

Figure 3:
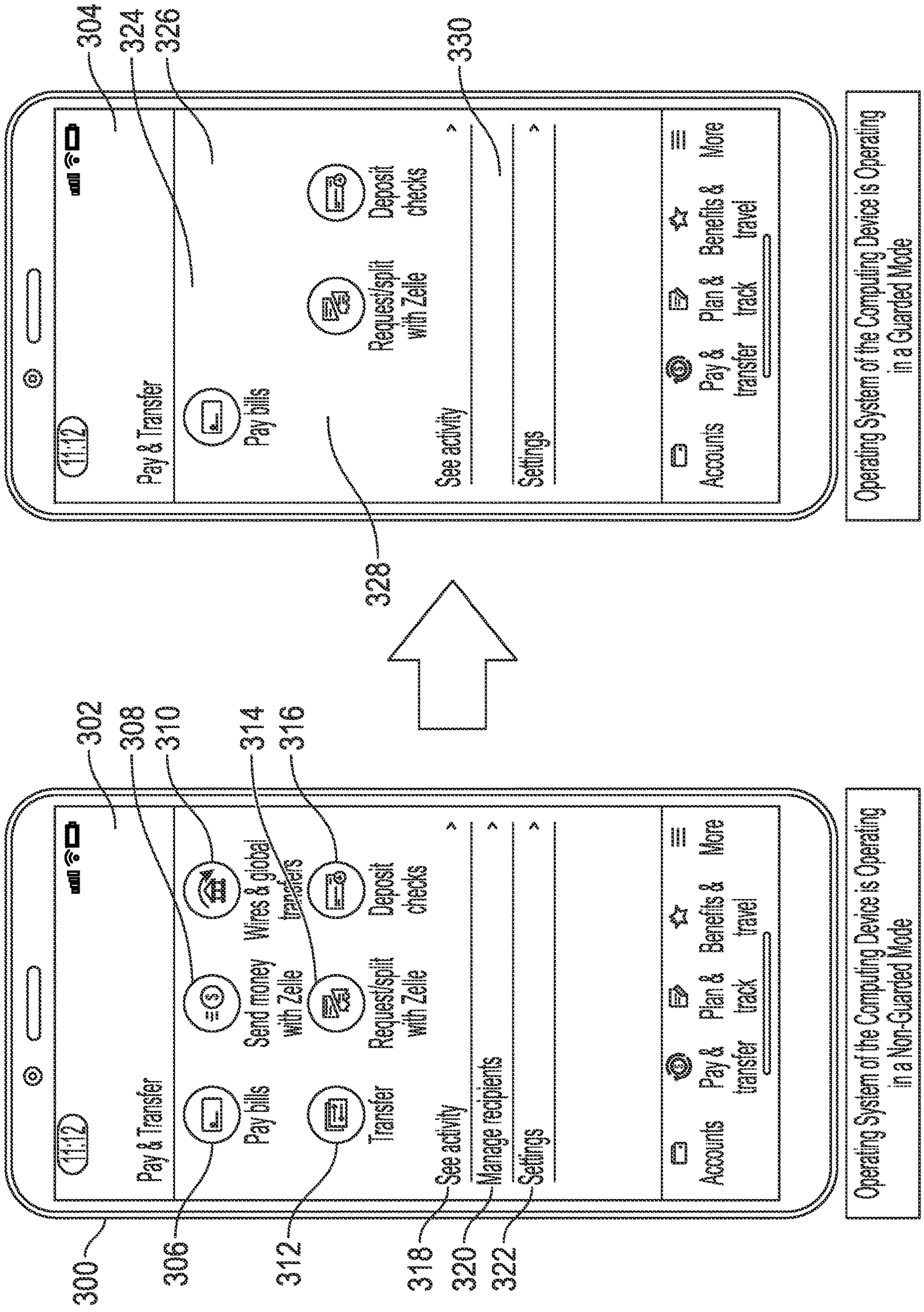
FIG. 3 shows an illustrative example of providing a guarded mode that modifies functions of a third-party application, in accordance with some embodiments of this disclosure.

FIG. 3 shows an illustrative example of providing a guarded mode that modifies functions of a third-party application, in accordance with some embodiments of this disclosure. The OS of computing device 300, comprising user interfaces 302 and 304, implements a guarding system as described above in connection with FIG. 1. Computing device 300 may correspond to computing device 102 and 200 of FIGS. 1 and 2, respectively. In some embodiments, while the OS of the computing device is operating in the non-guarded mode, the guarding system receives a first input selecting an icon for a third-party application. For example, the guarding system receives, via a user interface selection at the user interface of a computing device, e.g., computing device 300, an input selecting the icon of the Chase Mobile® app. While the OS of the computing device is operating in the non-guarded mode, and upon the third-party application launching at the computing device, the guarding system provides for display a plurality of user interface options related to functions of the third-party application. For example, while the OS of computing device 300 is operating in the non-guarded mode, the guarding system may provide for display, at user interface 302, user interface option 306 for paying bills, user interface option 308 for sending money with Zelle®, user interface option 310 for wire and global transfers, user interface option 312 for transferring money between accounts, user interface option 314 for requesting money with Zelle®, user interface option 316 for depositing checks, user interface option 318 for viewing account activity, user interface option 320 for managing recipients, and user interface option 322 for viewing settings.

In some embodiments, while the OS of the computing device is operating in the guarded mode, the guarding system modifies at least one function of the plurality of functions of the third-party application. In some embodiments, the guarding system provides for display a subset of the plurality of user interface options related to functions of the third-party applications and prevents display of the other user interface options not included in the subset. For example, while the OS of computing device 300 is operating in the guarded mode, the guarding system provides for display user interface 304, which comprises a subset of the plurality of user interface options related to the functions of the Chase Mobile® app, e.g., user interface option 306 for paying bills, user interface option 314 for requesting money with Zelle®, user interface option 316 for depositing checks, user interface option 318 for seeing account activity, and user interface option 322 for viewing settings. In this example, the guarding system prevents display of user interface options 308, 310, 312, and 320 and instead displays blank portions 324, 326, 328, and 330. Such aspects provide security to the user associated with the user account logged in to the third-party application by disabling access to sensitive functions of the third-party applications when someone other than the user associated with the computing device is using the computing device. In some embodiments, the guarding system disables access to functions that have been selected by prior user interface selections. In some embodiments, the guarding system disables access to functions that the guarding system detects are sensitive functions and/or relate to sensitive information regarding the associated user.

In some embodiments, the guarding system may enable a user to add a guarded mode shortcut to a quick settings menu to quickly activate guarded mode. In some embodiments, upon activation of the guarded mode, the shortcut to the feature is removed or hidden from the device's quick menu, rendering it inconspicuous to unauthorized users. In some embodiments, the guarding system disables access to at least one function of the plurality of functions of the third-party application. For example, while the OS of computing device 300 is operating in the guarded mode, the guarding system modifies the functions of the Chase Mobile® app such that the Chase Mobile® app disables access to money transfers between any accounts. In another example, while the OS of computing device 300 is operating in the guarded mode, the guarding system modifies the functions of the Chase Mobile® app such that the Chase Mobile® app can transfer money only between pre-designated accounts. In another example. while the OS of computing device 300 is operating in the guarded mode, the guarding system modifies the functions of the Chase Mobile® app such that the Chase Mobile® app prevents money transfers to new accounts that have not received transfers before from the user profile logged in to the Chase Mobile® app. Such aspects prevent users not associated with computing device 300 from using sensitive functions of the third-party application in ways that are likely outside the scope of what the associated user, e.g., user 100 described in FIG. 1, expects such other users to use his or her computing device 300 for. In some embodiments, while the OS of the computing device is operating in the guarded mode, the guarding system prevents display of an icon indicating that the OS of computing device 300 is operating in the guarded mode. Such aspects may help cause the guarded mode of the OS to be discrete and undetectable to users other than user 100 associated with computing device 300.

FIGS. 4-5 describe illustrative devices, systems, servers, and related hardware for providing a guarded mode for an operating system of a computing device, in accordance with some embodiments of the present disclosure. FIG. 4 shows generalized embodiments of illustrative user equipment 400 and 401, which may correspond to, e.g., computing device 102 of FIG. 1, computing device 200 of FIG. 2, or computing device 300 of FIG. 3. For example, user equipment 400 may be a smartphone device, a tablet, a near-eye display device, an XR device, or any other suitable device capable of participating in a XR environment, e.g., locally or over a communication network. In another example, user equipment 401 may be a user television equipment system or device. User equipment 401 may include set-top box 415. Set-top box 415 may be communicatively connected to microphone 416, audio output equipment 414 (e.g., speaker or headphones), and display 412. In some embodiments, microphone 416 may receive audio corresponding to a voice of a user and/or ambient audio data while the OS of a device is operating in a guarded mode. In some embodiments, display 412 may be a television display or a computer display. In some embodiments, set-top box 415 may be communicatively connected to user input interface 410. In some embodiments, user input interface 410 may be a remote-control device. Set-top box 415 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 5. In some embodiments, user equipment 400 may comprise any suitable number of sensors (e.g., gyroscope or gyrometer, or accelerometer, etc.), and/or a GPS module (e.g., in communication with one or more servers and/or cell towers and/or satellites) to ascertain a location of user equipment 400. In some embodiments, user equipment 400 comprises a rechargeable battery that is configured to provide power to the components of the device.

Each one of user equipment 400 and user equipment 401 may receive content and data via input/output (I/O) path 402. I/O path 402 may provide content (e.g., broadcast programming, on-demand programming, internet content, content available over a local area network (LAN) or wide area network (WAN), and/or other content) and data to control circuitry 404, which may comprise processing circuitry 406 and storage 408. Control circuitry 404 may be used to send and receive commands, requests, and other suitable data using I/O path 402, which may comprise I/O circuitry. I/O path 402 may connect control circuitry 404 to one or more communications paths (described below). I/O functions may be provided by one or more of these communications paths but are shown as a single path in FIG. 4 to avoid overcomplicating the drawing. While set-top box 415 is shown in FIG. 4 for illustration, any suitable computing device having processing circuitry, control circuitry, and storage may be used in accordance with the present disclosure. For example, set-top box 415 may be replaced by, or complemented by, a personal computer (e.g., a notebook, a laptop, a desktop), a smartphone (e.g., user equipment 400), an XR device, a tablet, a network-based server hosting a user-accessible client device, a non-user-owned device, any other suitable device, or any combination thereof.

Control circuitry 404 may be based on any suitable control circuitry such as processing circuitry 406. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 404 executes instructions for the guarding application stored in memory (e.g., storage 408). Specifically, control circuitry 404 may be instructed by the guarding application to perform the functions discussed above and below. In some implementations, processing or actions performed by control circuitry 404 may be based on instructions received from the guarding application.

In client/server-based embodiments, control circuitry 404 may include communications circuitry suitable for communicating with a server or other networks or servers. The guarding application may be a stand-alone application implemented on a device or a server. In some embodiments, there is a single attribute, e.g., "the guarded mode," that applications may observe via an operating system API. In some embodiments, the applications are responsible for implementing the guarded mode, as the application developers know the optimal way to implement the guarded mode on the respective application. The guarding application may be implemented as software or a set of executable instructions. The instructions for performing any of the embodiments discussed herein of the guarding application may be encoded on non-transitory computer-readable media (e.g., a hard drive, random-access memory on a DRAM integrated circuit, read-only memory on a BLU-RAY disk, etc.). For example, in FIG. 4, the instructions may be stored in storage 408, and executed by control circuitry 404 of a user equipment 400.

In some embodiments, the guarding application may be a client/server application where only the client application resides on user equipment 400, and a server application resides on an external server (e.g., server 504 and/or media content source 502). For example, the guarding application may be implemented partially as a client application on control circuitry 404 of user equipment 400 and partially on server 504 as a server application running on control circuitry 511. Server 504 may be a part of a local area network with one or more of user equipment 400, 401 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 504 and/or an edge computing device), referred to as "the cloud." User equipment 400 may be a cloud client that relies on the cloud computing capabilities from server 504 to generate personalized engagement options in a VR environment.

Control circuitry 404 may include communications circuitry suitable for communicating with a server, edge computing systems and devices, a table or database server, or other networks or servers. The instructions for carrying out the above-mentioned functionality may be stored on a server (which is described in more detail in connection with FIG. 5). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication networks or paths (which is described in more detail in connection with FIG. 5). In addition, communications circuitry may include circuitry that enables peer-to-peer communication of user equipment, or communication of user equipment in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 408 may be used to store various types of content described herein as well as guarding application data described above. Nonvolatile memory may also be used (e.g., to launch a boot-up routine and other instructions). Cloud-based storage, described in relation to FIG. 4, may be used to supplement storage 408 or instead of storage 408. Non-transitory memory may store instructions that, when executed by control circuitry, I/O circuitry, any other suitable circuitry or combination thereof, executes functions of a guarding application as described above.

Control circuitry 404 may include video generating circuitry and tuning circuitry, such as one or more analog tuners, one or more MPEG-2 decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 404 may also include scaler circuitry for upconverting and downconverting content into the preferred output format of user equipment 400. Control circuitry 404 may also include digital-to-analog converter circuitry and analog-to-digital converter circuitry for converting between digital and analog signals. The tuning and encoding circuitry may be used by user equipment 400, 401 to receive and to display, to play, or to record content. The tuning and encoding circuitry may also be used to receive video communication session data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

Control circuitry 404 may receive instruction from a user by way of user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of user equipment 400 and user equipment 401. For example, display 412 may be a touchscreen or touch-sensitive display. In such circumstances, user input interface 410 may be integrated with or combined with display 412. In some embodiments, user input interface 410 includes a remote-control device having one or more microphones, buttons, keypads, any other components configured to receive user input or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 415.

Audio output equipment 414 may be integrated with or combined with display 412. Display 412 may be one or more of a monitor, television, liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 412. Audio output equipment 414 may be provided as integrated with other elements of each one of user equipment 400 and user equipment 401 or may be stand-alone units. An audio component of videos and other content displayed on display 412 may be played through speakers (or headphones) of audio output equipment 414. In some embodiments, audio may be distributed to a receiver (not shown), which processes and outputs the audio via speakers of audio output equipment 414. In some embodiments, for example, control circuitry 404 is configured to provide audio cues to a user, or other audio feedback to a user, using speakers of audio output equipment 414. There may be a separate microphone 416 or audio output equipment 414 may include a microphone configured to receive audio input such as voice commands or speech. For example, a user may speak letters or words that are received by the microphone and converted to text by control circuitry 404. In a further example, a user may voice commands that are received by a microphone and recognized by control circuitry 404. Camera 418 may be any suitable video camera integrated with the equipment or externally connected. Camera 418 may be a digital camera comprising a charge-coupled device (CCD) and/or a complementary metal-oxide semiconductor (CMOS) image sensor. Camera 418 may be an analog camera that converts to digital images via a video card.

The guarding application may be implemented using any suitable architecture. For example, it may be a stand-alone guarding application wholly implemented on each one of user equipment 400 and user equipment 401. In such an approach, instructions of the guarding application may be stored locally (e.g., in storage 408), and data for use by the application is downloaded on a periodic basis (e.g., from an out-of-band feed, from an internet resource, or using another suitable approach). Control circuitry 404 may retrieve instructions of the guarding application from storage 408 and process the instructions to provide video conferencing functionality and generate any of the displays discussed herein. Based on the processed instructions, control circuitry 404 may determine what action to perform when input is received from user input interface 410. For example, movement of a cursor on a display up/down may be indicated by the processed instructions when user input interface 410 indicates that an up/down button was selected. A guarding application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, random access memory (RAM), etc.

Control circuitry 404 may allow a user to provide user profile information or may automatically compile user profile information. For example, control circuitry 404 may access and monitor network data, video data, audio data, processing data, participation data from a conference participant profile. Control circuitry 404 may obtain all or part of other user profiles that are related to a particular user (e.g., via social media networks), and/or obtain information about the user from other sources that control circuitry 404 may access. As a result, a user can be provided with a unified experience across the user's different devices.

In some embodiments, the guarding application is a client/server-based application. Data for use by a thick or thin client implemented on each one of user equipment 400 and user equipment 401 may be retrieved on demand by issuing requests to a server remote to each one of user equipment 400 and user equipment 401. For example, the remote server may store the instructions for the guarding application in a storage device. The remote server may process the stored instructions using circuitry (e.g., control circuitry 404) and generate the displays discussed above and below. The client device may receive the displays generated by the remote server and may display the content of the displays locally on user equipment 400. This way, the processing of the instructions is performed remotely by the server while the resulting displays (e.g., that may include text, a keyboard, or other visuals) are provided locally on user equipment 400. User equipment 400 may receive inputs from the user via user input interface 410 and transmit those inputs to the remote server for processing and generating the corresponding displays. For example, user equipment 400 may transmit a communication to the remote server indicating that an up/down button was selected via user input interface 410. The remote server may process instructions in accordance with that input and generate a display of the guarding application corresponding to the input (e.g., a display that moves a cursor up/down). The generated display is then transmitted to user equipment 400 for presentation to the user.

In some embodiments, the guarding application may be downloaded and interpreted or otherwise run by an interpreter or virtual machine (run by control circuitry 404). In some embodiments, the guarding application may be encoded in the ETV Binary Interchange Format (EBIF), received by control circuitry 404 as part of a suitable feed, and interpreted by a user agent running on control circuitry 404. For example, the guarding application may be an EBIF application. In some embodiments, the guarding application may be defined by a series of JAVA-based files that are received and run by a local virtual machine or other suitable middleware executed by control circuitry 404. In some of such embodiments (e.g., those employing MPEG-2, MPEG-4, HEVC or any other suitable digital media encoding schemes), the guarding application may be, for example, encoded and transmitted in an MPEG-2 object carousel with the MPEG audio and video packets of a program.

As shown in FIG. 5, user equipment 506, 507, 508, 510 (which may correspond to user equipment, e.g., computing device 102 of FIG. 1, computing device 200 of FIG. 2, or computing device 300 of FIG. 3) may be coupled to communication network 509. Communication network 509 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 509) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 509.

System 500 may comprise media content source 502, one or more servers 504, and/or one or more edge computing devices. In some embodiments, the guarding application may be executed at one or more of control circuitry 511 of server 504 (and/or control circuitry of user equipment 506, 507, 508, 510 and/or control circuitry of one or more edge computing devices). In some embodiments, the media content source and/or server 504 may be configured to host or otherwise facilitate video communication sessions between user equipment 506, 507, 508, 510 and/or any other suitable user equipment, and/or host or otherwise be in communication (e.g., over communication network 509) with one or more social network services.

In some embodiments, server 504 may include control circuitry 511 and storage 514 (e.g., RAM, ROM, Hard Disk, Removable Disk, etc.). Storage 514 may store one or more databases. Server 504 may also include an I/O path 512. In some embodiments, I/O path 512 is an I/O circuitry. I/O circuitry may be a NIC card, audio output device, mouse, keyboard card, any other suitable I/O circuitry device or combination thereof. I/O path 512 may provide video conferencing data, device information, or other data, over a local area network (LAN) or wide area network (WAN), and/or other content and data to control circuitry 511, which may include processing circuitry, and storage 514. Control circuitry 511 may be used to send and receive commands, requests, and other suitable data using I/O path 512, which may comprise I/O circuitry. I/O path 512 may connect control circuitry 511 to one or more communications paths.

Control circuitry 511 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 511 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 511 executes instructions for an emulation system application stored in memory (e.g., the storage 514). Memory may be an electronic storage device provided as storage 514 that is part of control circuitry 511. Memory may store instruction to run a guarding application.

Figure 6:
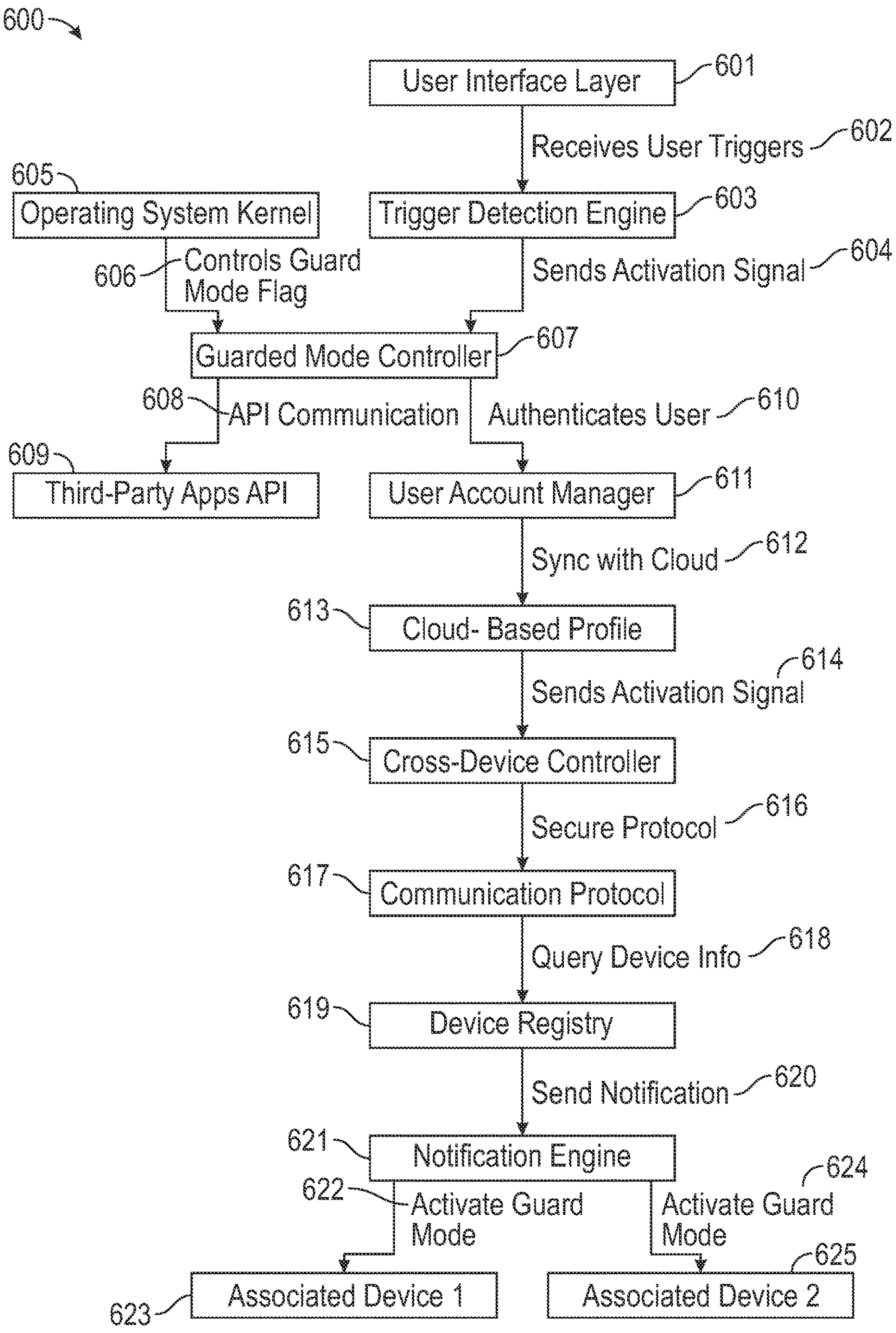
FIG. 6 is a flowchart of an illustrative process for providing a guarded mode of an operating system across a plurality of associated computing devices, in accordance with some embodiments of this disclosure.

FIG. 6 is a flowchart of a detailed illustrative process 600 for activating a guarded mode of an OS across a plurality of associated computing devices, in accordance with some embodiments of this disclosure. In various embodiments, the individual steps of process 600 may be implemented by one or more components of the devices, methods, and systems of FIGS. 1-5 and 7-9 and may be performed in combination with any of the other processes and aspects described herein. Although the present disclosure may describe certain steps of process 600 (and of other processes described herein) as being implemented by certain components of the devices, methods, and systems of FIGS. 1-5 and 7-9, this is for purposes of illustration only, and it should be understood that other components of the devices, methods, and systems of FIGS. 1-5 and 7-9 may implement those steps instead.

At 602, control circuitry (e.g., control circuitry 404 of user equipment 400, and/or control circuitry 511 of server 504), receives, via a user interface layer (e.g., user interface layer 601) of a computing device (e.g., computing device 102 of FIG. 1), a user trigger. User interface layer 601 enables user-interactable elements that facilitate management and customization of the guarded mode. User interface layer 601 has bidirectional communication with a trigger detection engine and sends the user trigger to the trigger detection engine. The user triggers may be any suitable customizable triggers, e.g., button presses, biometric inputs, geofencing, determining a current time is within a scheduled time interval, user interface inputs, user inputs received via a computing device, any other suitable trigger, or any combination thereof. For example, as described above in connection with FIG. 1, computing device 102 receives user input 108, which is configured to initiate the guarded mode of iOS.

At 604, a trigger detection engine (e.g., trigger detection engine 603) (e.g., an algorithmic construct that actively scans for and identifies the activation triggers input by a user associated with the computing device) sends an activation signal to a guarded mode controller, e.g., guarded mode controller 607 (e.g., when the trigger condition is determined to be met). At 606, an OS kernel (e.g., OS kernel 605), which operates at the core of the computing device's OS, may be modified to include a guarded mode flag. For example, the guarded mode flag may be a Boolean flag variable, stored in kernel memory, which can be toggled on or off as a key indicator, coordinating changes in behavior across various layers of the system. Guarded mode controller 607 may be responsible for orchestrating various activities once the guarded mode flag is set to "true" or "on." Guarded mode controller 607 interfaces with OS kernel 605 and instructs both user interface layer 601 and third-party applications 609 (and/or other resident applications installed at computing device 102) to adapt their behavior according to rules, e.g., which may have been pre-configured by the user, or may be set by the OS automatically or by default.

At 608, in response to receiving the activation signal from trigger detection engine 603 and instruction from OS kernel 605 to toggle on the guarded mode flag, guarded mode controller 607 communicates with third-party applications 609 via an API. In some embodiments, the API may enable extending the functionality of the guarded mode to third-party applications 609. To enable interaction with third-party software, an API is provided that allows third-party applications 609 to query the status of the guarded mode flag. This allows third-party applications 609 to dynamically alter their operation, presenting a coordinated, system-wide alteration in behavior. In some embodiments, the API comprises a set of callable functions and data structures that facilitate the interaction between the core components of the guarded mode of the OS and third-party applications 609 installed on the computing device.

For example, an API function queryGuardedModeStatus ( ) may enable a third-party application to inquire about the current status of the guarded mode flag from guarded mode controller 607. The API function queryGuardedModeStatus ( ) may return a data structure that indicates whether the guarded mode flag is triggered and specifies the security level of the trigger (e.g., low-level, high-level, or any other suitable security level). The "High" level is usually activated under circumstances that suggest immediate danger or duress, such as an emergency situation. In some embodiments, techniques for detecting whether a user is under duress may be employed based on the disclosure in U.S. application Ser. No. 18/232,994 "Methods for User Payments or Access Validation Management Through User State Determination," the contents of which are hereby incorporated by reference herein in their entirety. In contrast, the "Low" level can be activated for more routine privacy concerns, such as when sharing the computing device with a colleague or friend. Each level has a different set of behaviors and restrictions that are communicated to third-party applications 609 via the API. Another example is an API function setOperationalMode ( ) which third-party applications 609 can use to adjust their behavior based on the returned status of the guarded mode. The OS kernel allows and disables particular functions of the third-party applications based on the status of the guarded mode flag. For example, a messaging app may disable message previews and notifications when the device is in "High" level guarded mode, while it may only mute notifications in the "Low" level. Such aspects allow third-party applications 609 to modify their functions in real time or near real time.

At 610, guarded mode controller 607 authenticates a user associated with a user account of the computing device. In some embodiments, guarded mode controller 607 of the computing device generates for display, at the user interface of the computing device, a user interface prompt for a user interface input of a password associated with the user account logged in to the computing device. For example, guarded mode controller 607 of computing device 102 generates for display, at the user interface of computing device 102, a user interface prompt for a user interface input of a password associated with the Apple ID that computing device 102 is currently logged in to.

In some embodiments, activation of a guarded mode on one device also activates a guarded mode on other devices associated with the same user account. For example, the guarding system may employ user account manager 611, cross-device controller 615, communication protocol 617, device registry 619, and notification engine 621. At 612, user account manager 611 may perform a synchronization operation with cloud servers to determine whether the authenticated user account that the computing device (e.g., computing device 102) is logged in to is also logged in to by other computing devices associated with the same user account. User account manager 611 is tasked with managing user credentials and synchronizing this information with cloud services. For example, computing device 102 may be logged in to the user account associated with Jane Doe's Apple ID. User account manager 611 determines via one or more remote cloud server(s) that the user account associated with Jane Doe's Apple ID is also logged in at a tablet (e.g., where the tablet and the smartphone share common login credentials). Based on such determination, the guarding system may determine that Jane Doe has a cloud-based profile, e.g., cloud-based profile 613, that is used across multiple associated devices.

At 614, cloud-based profile 613 sends an activation signal to cross-device controller 615. Cross-device controller 615 oversees the activation of the guarded mode on all devices linked to the same user account, e.g., computing device 102 and the laptop logged in to Jane Doe's Apple ID. At 616, cross-device controller 615 employs a secure, encrypted communication protocol, e.g., communication protocol 617, that establishes rules for the transmission of the guarded mode activation signals between associated devices. At 618, communication protocol 617 queries device info from a device registry, e.g., device registry 619. In some embodiments, device registry 619 functions as a secure and encrypted database to hold information on devices that are associated with the user's account. At 620, device registry 619 sends a notification to a notification engine, e.g., notification engine 621, that the guarded mode flag has been triggered (e.g., OS kernel 605 set the flag to "true"). In some embodiments, notification engine 621 is designed to handle the transmission of status notifications between devices.

Upon activation of the guarded mode on the initial device, e.g., computing device 102, at step 622, guarded mode controller 607 within the initial device communicates with OS kernel 605 to set the guarded mode flag to "true," thereby activating the mode on associated device 1 623. Following this, user account manager 611 authenticates the user and synchronizes this change to encrypted and secure cloud-based profile 613. After cloud-based profile 613 has been updated, it sends out a notification via secure communication protocol 617 to cross-device controller 615 for all associated devices. In response to receiving this notification, cross-device controller 615 on each associated device then communicates with its own OS kernel, e.g., OS kernel 605, to also set the guarded mode flag to "true," thereby activating the mode on associated device 2 625, e.g., at step 624, achieving a coordinated activation of the guarded mode across all devices linked to the same user account.

In some embodiments, the OS of each computing device that is linked to the same user account and thus controlled by cross-device controller 615 may be configured to operate in the guarded mode at a particular security level based on the type of each device. For example, the OS of the initial device, e.g., computing device 102, operates in a high security-level guarded mode because computing device 102, e.g., a smartphone, is most accessible to users other than the associated user and more portable than larger devices. The OS of another device, for example, a television, operates in a low security-level guarded mode because the television is not as accessible to users other than the associated user and is less portable than smaller devices.

Figure 7:
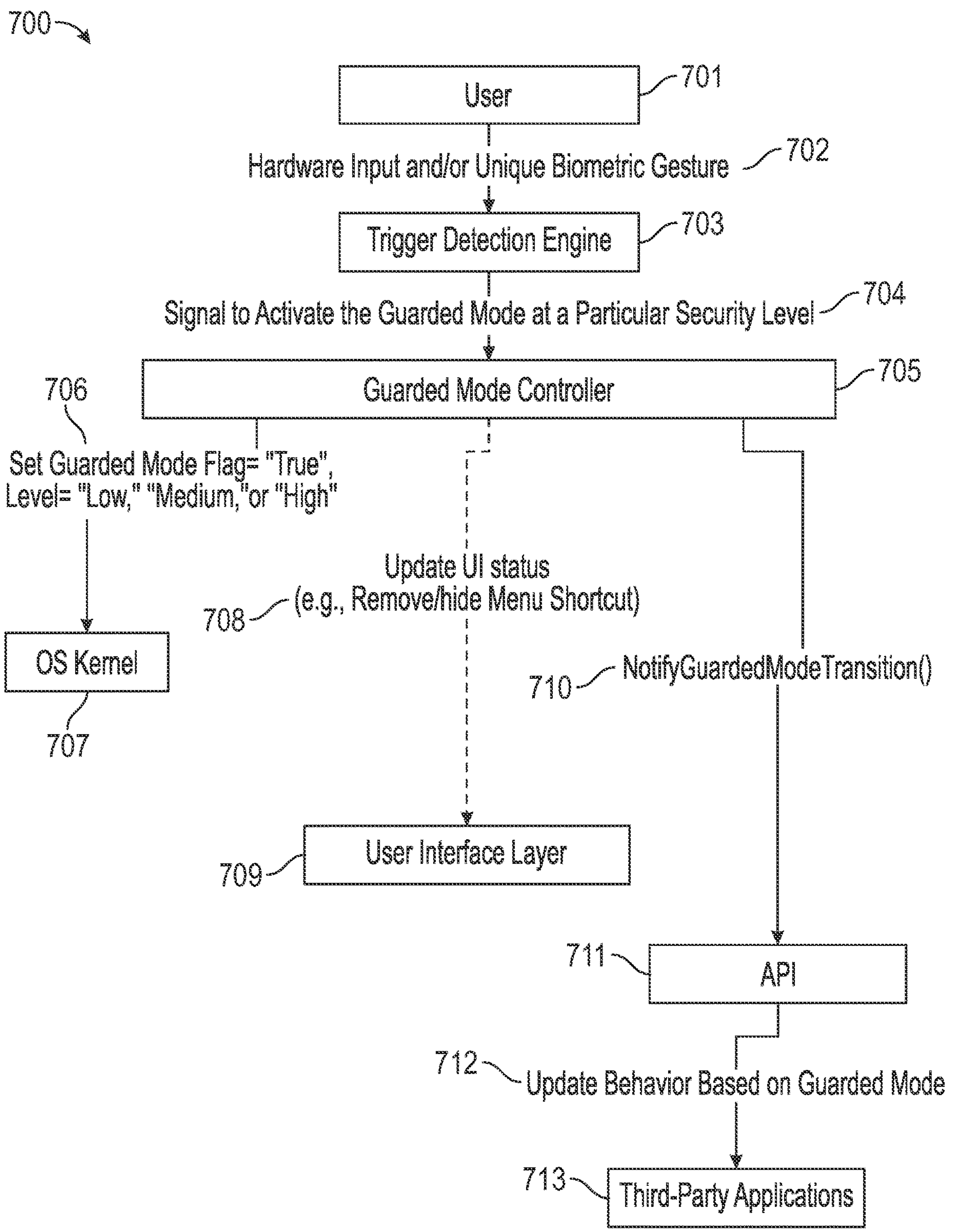
FIG. 7 is a flowchart of an illustrative process for providing a guarded mode of an operating system of a computing device, in accordance with some embodiments of this disclosure.

FIG. 7 is a flowchart of a detailed illustrative process 700 for activating a guarded mode of an OS, in accordance with some embodiments of this disclosure. In various embodiments, the individual steps of process 700 may be implemented by one or more components of the devices, methods, and systems of FIGS. 1-5 and 8-9 and may be performed in combination with any of the other processes and aspects described herein. Although the present disclosure may describe certain steps of process 700 (and of other processes described herein) as being implemented by certain components of the devices, methods, and systems of FIGS. 1-5 and 8-9, this is for purposes of illustration only, and it should be understood that other components of the devices, methods, and systems of FIGS. 1-5 and 8-9 may implement those steps instead.

At 702, control circuitry of a computing device (e.g., control circuitry 404 of user equipment 400, and/or control circuitry 511 of server 504), receives a hardware input and/or a biometric gesture from a user, e.g., user 701, associated with the computing device. In some embodiments, the control circuitry receives a hardware input, e.g., a press of a volume button, a press of a lock button, any other suitable hardware input, or any combination thereof. In some embodiments, the control circuitry receives a biometric gesture, e.g., the touch of a thumb of a user, a detected facial expression, an elevated heartrate, any other suitable biometric input, or any combination thereof. The control circuitry may receive a combination of a hardware input and a biometric gesture.

At 704, trigger detection engine 703 (e.g., an algorithmic construct that actively scans for and identifiers the activation triggers input by a user associated with the computing device) signals to guarded mode controller 705 to activate the guarded mode at a particular security level. Guarded mode controller 705 is responsible for orchestrating various activities once the guarded mode flag is set to "true" or "on." Guarded mode controller 705 interfaces with OS Kernel 707 and instructs both user interface layer 709 and third-party applications 713, via API 711, to adapt their behavior according to rules that have been pre-configured by the user. Trigger detection engine 703 determines the particular security level based on the received hardware input and/or unique biometric gesture. In some embodiments, security levels are determined according to rules that have been pre-configured by the user. For example, control circuitry 404 determines, via user interface selections of user interface options relating to configuring security rules, that receiving three simultaneous presses of the volume button and the lock button of computing device 102 corresponds to a low-level security guarded mode.

At 706, guarded mode controller 705, via control circuitry (e.g., control circuitry 404), instructs OS kernel 707 to set a guarded mode flag to "True," thereby initiating the guarded mode of the OS of the computing device. Guarded mode controller 705 also instructs OS kernel 707 to set a security level of the guarded mode of the OS based on the particular security level detected by trigger detection engine 703. For example, guarded mode controller 705 sets the security level of the guarded mode to "Low" because the control circuitry received three simultaneous presses of the volume button and the lock button of computing device 102. Based on the particular security level and pre-configured rules for the particular security level, at 708, guarded mode controller 705, via control circuitry, updates the user interface (UI) status of user interface layer 709 of the computing device. In some embodiments, control circuitry, e.g., control circuitry 404, generates for display an icon for the guarded mode of the OS of the computing device at a menu shortcut user interface of the computing device.

At 710, guarded mode controller 705, via control circuitry, instructs API 711 of the computing device to implement an API function, e.g., notifyGuardedModeTransition ( ) Such API function of notifyGuardedModeTransition, when implemented by API 711, may allow third-party applications 713 to receive real-time notifications whenever the guarded mode status changes. This enables third-party applications 713 to adapt their functionalities in real time or near real time according to the current mode. In some embodiments, the guarding system implements an architecture API support that comprises involves guarded mode controller 705 interfacing directly with API 711. When a predefined trigger is detected, guarded mode controller 705 toggles the guarded mode flag and sends a notification to API 711. In turn, API 711 communicates these changes to third-party applications 713 by invoking relevant API functions, such as notifyGuardedModeTransition ( ) At 712, API 711 instructs third-party applications 713 to update their behavior based on the OS operating in the guarded mode. For example, the control circuitry of the computing device prevents display of icons for the plurality of third-party applications while the OS is operating in the guarded mode.

Figure 8:
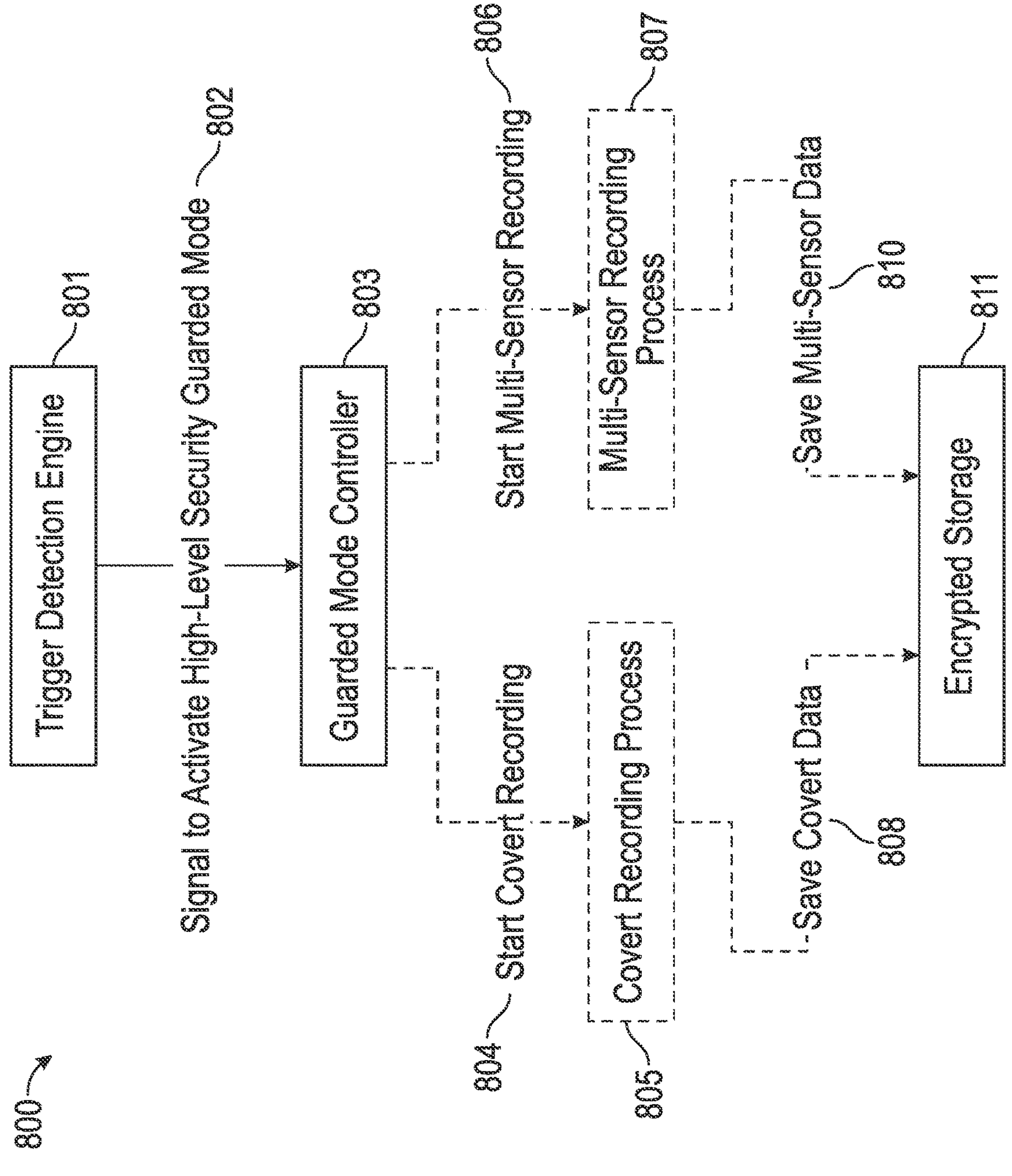
FIG. 8 is a flowchart of an illustrative process for providing a recording process(es) for a high-level security guarded mode, in accordance with some embodiments of this disclosure.

FIG. 8 is a flowchart of a detailed illustrative process 800 for, upon activation of a high-level security guarded mode, initiating covert recording and/or multi-sensor recording, in accordance with some embodiments of this disclosure. In various embodiments, the individual steps of process 800 may be implemented by one or more components of the devices, methods, and systems of FIGS. 1-5 and 7 and 9 and may be performed in combination with any of the other processes and aspects described herein. Although the present disclosure may describe certain steps of process 800 (and of other processes described herein) as being implemented by certain components of the devices, methods, and systems of FIGS. 1-5 and 7 and 9, this is for purposes of illustration only, and it should be understood that other components of the devices, methods, and systems of FIGS. 1-5 and 7 and 9 may implement those steps instead. In some embodiments, process 800 can be integrated in, or can be separate from, standard camera and audio recording applications to help ensure stealth operation.

At 802, control circuitry of a computing device (e.g., control circuitry 404 of user equipment 400, and/or control circuitry 511 of server 504), via a trigger detection engine, e.g., trigger detection engine 801, of the computing device, signals to a guarded mode controller, e.g., guarded mode controller 803, to activate a high-level security guarded mode.

At step 804, guarded mode controller 803, via control circuitry, starts a covert recording. For example, control circuitry 404 of computing device 102 initiates a recording of audio and video data via a camera, e.g., camera 418, and a microphone, e.g., microphone 416 of computing device 102. In some embodiments, the standard recording indicators of computing device 102, e.g., LED lights, user interface icons, audio effects, are inactive while the OS is operating in the high-level security guarded mode. For example, the computing device's (e.g., computing device 102 of FIG. 1) standard indicators, such as LED lights or user interface icons that signify recording while the OS is operating in the non-guarded mode, may remain inactive. At step 806, guarded mode controller 803, via control circuitry, starts a multi-sensor recording. In some embodiments, images and imaging data are taken from a plurality of front-facing and rear-facing cameras and sensors, e.g., lidar, at varying lighting, exposure, and/or zoom levels. For example, control circuitry 404 of computing device 102 initiates a recording of image data using a lidar sensor of computing device 102. In some embodiments, guarded mode controller 803 performs steps 804 and 806 simultaneously. In some embodiments, the recordings of steps 804 and 806 occur for a particular period of time. For example, control circuitry records audio, video, and/or image data for 20 minutes after the OS begins operating in the high-level security guarded mode.

At step 808, the recorded, covert data from step 804 is saved at an encrypted local storage, e.g., encrypted storage 811, that is separate from the computing device's conventional photo and/or video storage. Encrypted local storage 811 may not be accessible to the user associated with the computing device or may be accessible only through a particular authentication. In some embodiments, the covert data is uploaded in real time to a secure cloud storage, depending on user preferences and network availability. Such aspects may be beneficial particularly if the device is subsequently confiscated or destroyed.

At step 810, the recorded, multi-sensor data from step 806 is saved at an encrypted local storage, e.g., encrypted storage 811, that is separate from the computing device's conventional photo and/or video storage. The recorded data may be saved in a dedicated, encrypted local storage compartment that is separate from the device's conventional photo or video gallery. The recorded, multi-sensor data from step 806 may be stored at the same encrypted local storage as the recorded, covert data from step 804. In some embodiments, the multi-sensor data is uploaded in real time to a secure cloud storage, depending on user preferences and network availability. Such aspects are beneficial particularly if the device is subsequently confiscated or destroyed.

The covert recording feature and the multi-sensor recording feature may also include capabilities, such as, for example, capturing GPS coordinates and/or other sensor data. One or more portions of such additional data may be bundled with the captured audio and/or video files, to enable the creation of a comprehensive record of events surrounding the high-risk situation.

Figure 9:
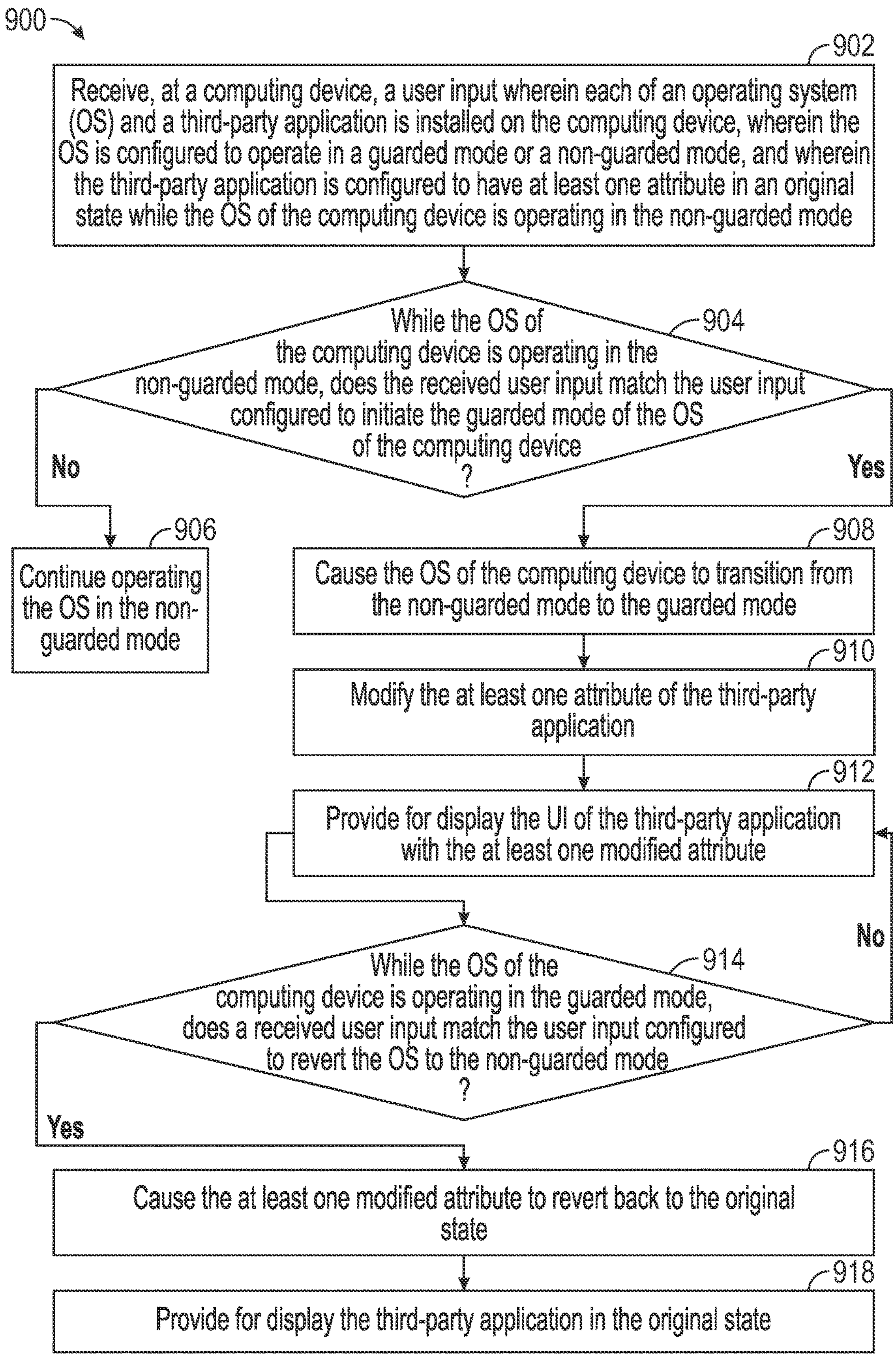
FIG. 9 is a flowchart of an illustrative process for providing a guarded mode and a non-guarded mode of an operating system of a computing device, in accordance with some embodiments of this disclosure.

FIG. 9 is a flowchart of a detailed illustrative process 900 for providing a guarded mode of an OS of a computing device, in accordance with some embodiments of this disclosure. In various embodiments, the individual steps of process 900 may be implemented by one or more components of the devices, methods, and systems of FIGS. 1-5, and 7 and 8 may be performed in combination with any of the other processes and aspects described herein. Although the present disclosure may describe certain steps of process 900 (and of other processes described herein) as being implemented by certain components of the devices, methods, and systems of FIGS. 1-5, and 7 and 8, this is for purposes of illustration only, and it should be understood that other components of the devices, methods, and systems of FIGS. 1-5, and 7 and 8 may implement those steps instead.

At 902, control circuitry of a computing device (e.g., control circuitry 404 of user equipment 400, and/or control circuitry 511 of server 504), receives a user input. The user input may correspond to user input 108 described in FIG. 1. Each of an OS and a third-party application may be installed on a computing device (e.g., computing device 102 of FIG. 1). In some embodiments, the OS is configured to operate in a guarded mode or a non-guarded mode, and the third-party application is configured to have at least one attribute in an original state while the OS of the computing device is operating in the non-guarded mode. For example, control circuitry 404 receives an indication of three presses of the lock button and the volume button of the computing device three times in a row. The at least one attribute of the third-party application, e.g., the Chase Mobile® app associated with icon 114 in FIG. 1, in the original state may be providing for display a user interface option to transfer money to other accounts. At 904, while the OS of the computing device is operating in the non-guarded mode, the control circuitry determines whether the received user input matches the user input configured to initiate the guarded mode of the OS of the computing device. For example, the user input configured to initiate the guarded mode of the OS of the computing device is pre-configured by user interface selections.

At 906, the control circuitry determines that the received user input does not match the user input configured to initiate the guarded mode of the OS of the computing device, thus the control circuitry continues operating the OS in the non-guarded mode. For example, the control circuitry receives an indication that the volume button of the computing device was pressed twice. However, if the user input configured to initiate the guarded mode of the OS of the computing device is three simultaneous presses of the volume button and/or the lock button, the control circuitry may determine that only receiving two presses of the volume button is not a match to the input or input pattern that is configured to initiate the guarded mode. In some embodiments, the control circuitry may determine to enter the guarded mode based on the received input being above a threshold similarity level to the preconfigured input to initiate the guarded mode, even if there is not an exact match. In some embodiments, biometric input identifying a particular user may be a precondition for entering the guarded mode. In some embodiments, if the received input pattern closely resembles, but does not match, the preconfigured input to initiate the guarded mode, the control circuitry may provide for display a notification that is selectable to enter the guarded mode, e.g., "It seems like you are trying to transition to the guarded mode. Tap here to enter the guarded mode."

At 908, the control circuitry determines that the received user input matches the user input configured to initiate the guarded mode of the OS of the computing device, thus the control circuitry causes the OS to transition from operating in the non-guarded mode to operating in the guarded mode. For example, the control circuitry may determine an exact match, or a match above a certain threshold between the received input and the preconfigured input intended to initiate the guarded mode. At 910, the control circuitry modifies the at least one attribute of the third-party application. The modified display may correspond to user interface 112 as described in FIG. 1. For example, the control circuitry prevents display of the user interface option for transferring money to other accounts for the Chase Mobile® app. At 912, the control circuitry provides for display the UI of the third-party application with the at least one modified attribute at the UI of the computing device. For example, the control circuitry provides for display the UI of the Chase Mobile® app without the display of the user interface option to transfer money to other accounts.

At 914, while the OS of the computing device is operating in the guarded mode, the control circuitry determines whether a received user input matches the user input configured to revert the OS to the non-guarded mode. For example, while the OS of the smartphone is operating in the guarded mode, the control circuitry receives a user input of a simultaneous press of the volume button and the lock button of the smartphone for six seconds. In some embodiments, such as if the control circuitry determines that the user input received at 902 does not match the user input configured to revert the OS to the non-guarded mode, the control circuitry may continue to provide for display the UI of the third-party application with the at least one modified attribute. In some embodiments, at step 914, the control circuitry determines that the received user input matches the user input configured to revert the OS to the non-guarded mode. Thus, at 916, the control circuitry causes the at least one modified attribute of the third-party application to revert to the original state. At 918, the control circuitry provides for display the third-party application in the original state. The reverted, original state may correspond to user interface 104 as described in FIG. 1. For example, control circuitry causes the Chase Mobile® app to display the user interface option for transferring money to other accounts.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:

receiving, at a computing device, a user input, wherein each of an operating system, a first third-party application, and a second third-party application is installed on the computing device, wherein the operating system is configured to operate in a guarded mode or a non-guarded mode, and wherein, while the operating system of the computing device is operating in the non-guarded mode, a first icon is provided for the first third-party application, the first icon being selectable to access sensitive data by way of the first third-party application, and a second icon is provided for the second third-party application, the second icon being selectable to access data by way of the second third-application;

determining, while the operating system of the computing device is operating in the non- guarded mode, whether the received user input matches a user input configured to initiate the guarded mode of the operating system of the computing device;

determining that the received user input matches the user input configured to initiate the guarded mode; and in response to the determining that the received user input matches the user input configured to initiate the guarded mode:

causing the operating system of the computing device to transition from the non-guarded mode to the guarded mode; and based on the operating system transitioning to the guarded mode:

modifying the first icon of the first third-party application to prevent display of the first icon to restrict the access to the sensitive data by way of the first third-party application; and maintaining display of the second icon for the second third-party application.

2. The method of claim 1, further comprising:

while the operating system of the computing device is operating in the non-guarded mode;

providing, for display at a user interface of the computing device, a plurality of icons for a plurality of third-party applications installed on the computing device, wherein each of the plurality of third-party applications do not provide access to sensitive data, and wherein the second icon for the second third-party application is from the plurality of icons for the plurality of third-party applications; and based on the operating system of the computing device is operating in transitioning to the guarded mode;

maintaining the display of the plurality of icons for the plurality of third-party applications based on the plurality of third-party applications not providing access to sensitive data, while preventing the display via the user interface of the first icon for the first third-party application.

3. The method of claim 2, wherein, while the operating system of the computing device is operating in the non-guarded mode, at least two icons for at least two third-party applications, including the first icon for the first third-party application, are provided for display at the user interface of the computing device, wherein each of the at least two third-party applications is selectable to access sensitive data; and the method further comprises, while the operating system of the computing device is operating in the guarded mode, preventing the display of the at least two icons for the at least two third-party applications, including the first icon for the first third-party application, via the user interface, while the continuing to maintain the display of the plurality of icons for the plurality of third-party applications that do not provide access to sensitive data.

4. The method of claim 1, wherein the at least one attribute of the third-party application corresponds to providing a plurality of functions while the operating system of the computing device is operating in the non-guarded mode; and while the operating system of the computing device is operating in the guarded mode, the modifying the at least one attribute of the third-party application comprises modifying at least one function of the plurality of functions of the third-party application.

5. The method of claim 1, further comprising:

while the operating system of the computing device is operating in the non-guarded mode:

providing for display an icon for the third-party application;

receiving a first input selecting the icon; and providing for display a plurality of data items related to the third-party application; and while the operating system of the computing device is operating in the guarded mode:

continuing to provide for display the icon for the third-party application;

receiving a second input selecting the icon; and providing for display a subset of the plurality of data items related to the third-party application and preventing display of data items of the plurality of data items not included in the subset.

6. The method of claim 5, wherein:

providing for display the plurality of data items related to the third-party application while the operating system of the computing device is operating in the non-guarded mode further comprises providing for display confidential data of at least one user account associated with the third-party application; and providing for display the subset of the plurality of data items related to the third-party application and preventing display of data items of the plurality of data items not included in the subset while the operating system of the computing device is operating in the guarded mode further comprises preventing display of the confidential data of the at least one user account associated with the third-party application.

7. The method of claim 1, further comprising:

providing for display, while the operating system is operating in the non-guarded mode, an icon for the guarded mode of the computing device; and in response to the causing the operating system of the computing device to transition from the non-guarded mode to the guarded mode, preventing display of the icon for the guarded mode of the computing device.

8. The method of claim 1, wherein, while in the guarded mode, the modifying the at least one attribute of the third-party application further comprises:

enabling the guarded mode to be initiated based on receiving any of a plurality of different inputs, wherein each of the plurality of different inputs is associated with a different security level;

determining a security level of the guarded mode based on a type of the received user input, wherein the received user input is received via at least one hardware element of the computing device; and in response to the determining the security level, modifying the at least one attribute of the third-party application of the computing device based on the determined security level.

9. The method of claim 8, further comprising:

determining that the determined security level of the guarded mode exceeds a threshold; and in response to the determining, causing at least one of ambient audio, or an image of an ambient environment, to be captured for a particular period of time.

10. The method of claim 1, wherein the user input is a first user input, and wherein the at least one attribute of the third-party application is in an original state while the operating system is operating in the non-guarded mode and is in a modified state while the operating system is operating in the guarded mode, the method further comprising:

receiving, at the computing device while the operating system of the computing device is operating in the guarded mode, a second user input;

determining whether the received second user input matches a user input configured to transition back to the non-guarded mode of the operating system of the computing device; and in response to determining that the received second user input matches the user input configured to transition back to the non-guarded mode:

causing the operating system of the computing device to transition from the guarded mode to the non-guarded mode; and while the operating system of the computing device is operating in the non- guarded mode, causing the at least one modified attribute of the third-party application to transition from the modified state back to the original state.

11. The method of claim 1, wherein:

the operating system comprises a kernel;

causing the operating system of the computing device to transition from the non-guarded mode to the guarded mode comprises:

modifying a guarded mode flag stored in memory associated with the kernel;

receiving, via an application programming interface (API) of the computing device, a query for a status of the guarded mode flag;

in response to the API returning a data structure that indicates that the guarded mode flag has been triggered:

modifying the at least one attribute of the third-party application.

12. The method of claim 11, wherein the query is a first query and the status is a first status, wherein the causing the operating system of the computing device to transition from the non-guarded mode to the guarded mode further comprises:

determining a security level of the guarded mode based on the received user input;

modifying the guarded mode flag stored in the memory associated with the kernel based on the determined security level;

receiving, via the API of the computing device, a second query for a second status of the guarded mode flag; and in response to the API returning the data structure that indicates that the guarded mode flag has been triggered:

modifying the at least one attribute of the third-party application.

13. The method of claim 1, wherein the third-party application is a first third-party application, a second third-party application is installed on the computing device, and the second third-party application is configured to have one or more attributes while the operating system of the computing device is operating in the non-guarded mode, and the method further comprising:

based on the operating system transitioning to the guarded mode, in addition to modifying the at least one attribute of the first third-party application, maintaining the one or more attributes of the second third-party application.

14. The method of claim 1, wherein the at least one attribute of the third-party application while the operating system of the computing device is operating in the non-guarded mode comprises a first attribute and a second attribute, the method further comprising:

based on the operating system transitioning to the guarded mode:

modifying the at least one attribute of the third-party application by modifying the first attribute of the third-party application; and maintaining the second attribute of the third-party application.

15. The method of claim 1, wherein the user input is received while the computing device is in an unlocked state in which a home screen is displayed, the home screen comprising a plurality of icons of third-party applications, the computing device entering the unlocked state in response to receiving, while in a locked state in which no icons of third-party applications are displayed, input authenticating a user of the computing device.

16. A system comprising:

input/output circuitry configured to:

receive, at a computing device, a user input, wherein each of an operating system, a first third-party application, and a second third-party application is installed on the computing device, wherein the operating system is configured to operate in a guarded mode or a non-guarded mode, and wherein, while the operating system of the computing device is operating in the non-guarded mode, a first icon is provided for the first third-party application, the first icon being selectable to access sensitive data by way of the first third-party application, and a second icon is provided for the second third-party application, the second icon being selectable to access data by way of the second third-application; and control circuitry configured to:

determine, while the operating system of the computing device is operating in the non-guarded mode, whether the received user input matches a user input configured to initiate the guarded mode of the operating system of the computing device;

determine that the received user input matches the user input configured to initiate the guarded mode; and in response to the determining that the received user input matches the user input configured to initiate the guarded mode:

cause the operating system of the computing device to transition from the non-guarded mode to the guarded mode; and based on the operating system transitioning to the guarded mode:

modify the first icon of the first third-party application to prevent display of the first icon to restrict the access to the sensitive data by way of the first third-party application; and maintain display of the second icon for the second third-party application.

17. The system of claim 16, wherein the input/output circuitry is further configured to:

while the operating system of the computing device is operating in the non-guarded mode;

provide, for display at a user interface of the computing device, a plurality of icons for a plurality of third-party applications installed on the computing device, wherein the plurality of third-party applications do not provide access to sensitive data, and wherein the second icon for the second third-party application is from the plurality of icons for the plurality of third-party applications; and while the operating system of the computing device is operating in the guarded mode;

maintain the display of the plurality of icons for the plurality of third-party applications based on the plurality of third-party applications not providing access to sensitive data, while preventing the display via the user interface of the first icon for the first third-party application.

18. The system of claim 17, wherein, while the operating system of the computing device is operating in the non-guarded mode, at least two icons for at least two third-party applications, including the first icon for the first third-party application, are provided for display at the user interface of the computing device, wherein each of the at least two third-party applications is selectable to access sensitive data; and the control circuitry is further configured to, while the operating system of the computing device is operating in the guarded mode, prevent the display of the at least two icons for the at least two third-party applications, including the first icon for the first third-party application via the user interface, while continuing to maintain the display of the plurality of icons for the plurality of third-party applications that do not provide access to sensitive data.

19. The system of claim 16, wherein the at least one attribute of the third-party application corresponds to providing a plurality of functions while the operating system of the computing device is operating in the non-guarded mode; and while the operating system of the computing device is operating in the guarded mode, the control circuitry is further configured to modify the at least one attribute of the third-party application by modifying at least one function of the plurality of functions of the third-party application.

20. The system of claim 19, wherein the control circuitry is further configured to modify the at least one function of the plurality of functions of the third-party application by disabling access to the at least one function.

* * * * *